United States Patent
Park et al.

(10) Patent No.: US 9,860,474 B2
(45) Date of Patent: Jan. 2, 2018

(54) MULTIMEDIA DEVICE HAVING FLEXIBLE DISPLAY AND CONTROLLING METHOD THEREOF

(71) Applicant: LG ELECTRONICS INC., Seoul (KR)

(72) Inventors: Junghoon Park, Pyeongtaek-si (KR); Dongwon Choi, Pyeongtaek-si (KR); Namhun Kim, Pyeongtaek-si (KR); Sunjung Hwang, Pyeongtaek-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/895,438

(22) PCT Filed: Sep. 10, 2013

(86) PCT No.: PCT/KR2013/008153
§ 371 (c)(1),
(2) Date: Dec. 2, 2015

(87) PCT Pub. No.: WO2014/200151
PCT Pub. Date: Dec. 18, 2014

(65) Prior Publication Data
US 2016/0112667 A1     Apr. 21, 2016

(30) Foreign Application Priority Data

Jun. 10, 2013  (KR) .................. 10-2013-0065936

(51) Int. Cl.
*H04N 5/64*     (2006.01)
*H04N 5/44*     (2011.01)
(Continued)

(52) U.S. Cl.
CPC ......... *H04N 5/4401* (2013.01); *G06F 1/1601* (2013.01); *G06F 1/1605* (2013.01);
(Continued)

(58) Field of Classification Search
CPC ..................................................... G06F 1/1652
See application file for complete search history.

(56) References Cited

U.S. PATENT DOCUMENTS 6,507,435 B1 *  1/2003  Bergman ............... G03B 21/58
                                                                359/443
8,593,401 B1 * 11/2013  Kim ....................... G06F 1/1647
                                                                345/1.1
(Continued)

FOREIGN PATENT DOCUMENTS

EP       2557558 A1    2/2013
EP       2565866 A1    3/2013
(Continued)

*Primary Examiner* — Michael Lee
*Assistant Examiner* — Humam Satti
(74) *Attorney, Agent, or Firm* — Birch, Stewart, Kolasch & Birch, LLP

(57) ABSTRACT

Disclosed are a multimedia device including a flexible display and controlling method thereof. The present invention includes a guide bar, a flexible display configured to be rolled up on an outer circumference of the guide bar, the flexible display having a first region rolled up on the outer circumference of the guide bar and a second region not rolled up on the outer circumference of the guide bar, a receiving unit configured to receive a content and metadata corresponding to the content from a source device, and a control unit adjusting a vertical width of the second region of the flexible display in accordance with a preset condition.

19 Claims, 16 Drawing Sheets

(51) Int. Cl.

| | | |
|---|---|---|
| *G06F 1/16* | (2006.01) | |
| *G06F 3/01* | (2006.01) | |
| *G06F 3/03* | (2006.01) | |
| *G06F 3/0346* | (2013.01) | |
| *H04N 7/01* | (2006.01) | |
| *H04N 21/41* | (2011.01) | |
| *H04N 21/422* | (2011.01) | |
| *H04N 21/431* | (2011.01) | |
| *H04N 21/442* | (2011.01) | |
| *H04N 21/488* | (2011.01) | |
| *G09G 3/00* | (2006.01) | |
| *H04N 21/485* | (2011.01) | |

(52) U.S. Cl.
CPC ............ *G06F 1/1652* (2013.01); *G06F 3/013* (2013.01); *G06F 3/017* (2013.01); *G06F 3/0304* (2013.01); *G06F 3/0346* (2013.01); *G09G 3/00* (2013.01); *H04N 5/64* (2013.01); *H04N 7/0122* (2013.01); *H04N 21/4131* (2013.01); *H04N 21/42201* (2013.01); *H04N 21/431* (2013.01); *H04N 21/44218* (2013.01); *H04N 21/4858* (2013.01); *H04N 21/4884* (2013.01); *H04N 21/4886* (2013.01); *G09G 2340/0442* (2013.01); *G09G 2380/02* (2013.01); *H04N 21/4852* (2013.01)

(56) References Cited

U.S. PATENT DOCUMENTS

| | | | |
|---|---|---|---|
| 2003/0128296 A1* | 7/2003 | Lee | H04N 5/44513 348/564 |
| 2004/0150747 A1* | 8/2004 | Sita | H04N 21/4621 348/558 |
| 2005/0007445 A1* | 1/2005 | Foote | H04N 7/142 348/14.08 |
| 2005/0176470 A1 | 8/2005 | Yamakawa | |
| 2007/0024750 A1* | 2/2007 | Wing Chung | G03B 21/56 348/556 |
| 2008/0150870 A1* | 6/2008 | Tsuyuki | G09G 3/3666 345/96 |
| 2009/0051830 A1* | 2/2009 | Matsushita | G02F 1/133305 348/836 |
| 2011/0227855 A1 | 9/2011 | Kim et al. | |
| 2012/0303742 A1 | 11/2012 | Hines | |
| 2013/0127917 A1 | 5/2013 | Kwack et al. | |
| 2014/0028596 A1* | 1/2014 | Seo | G06F 3/0487 345/173 |

FOREIGN PATENT DOCUMENTS

| | | |
|---|---|---|
| JP | 06237429 A * | 8/1994 |
| KR | 10-2009-0030138 A | 3/2009 |
| WO | WO 2004/084171 A1 | 9/2004 |

* cited by examiner

[Fig. 1a]
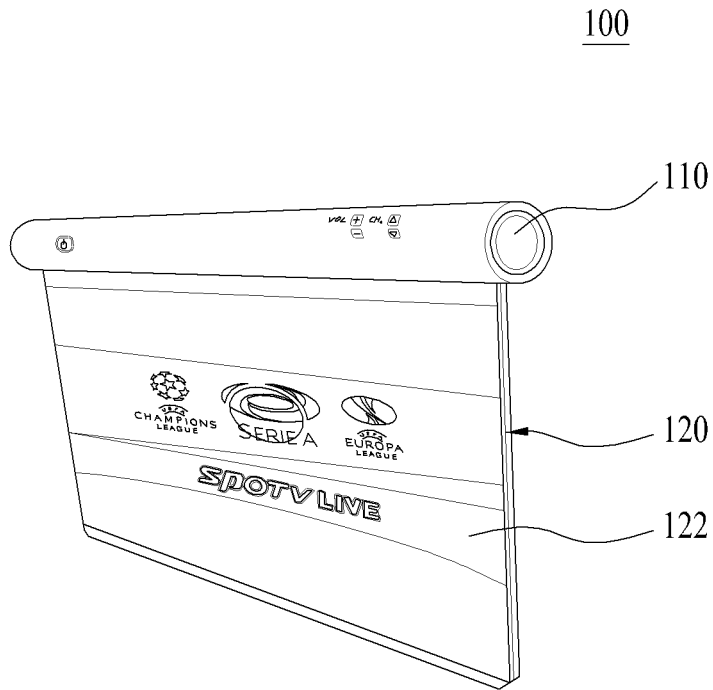
[Fig. 1b]
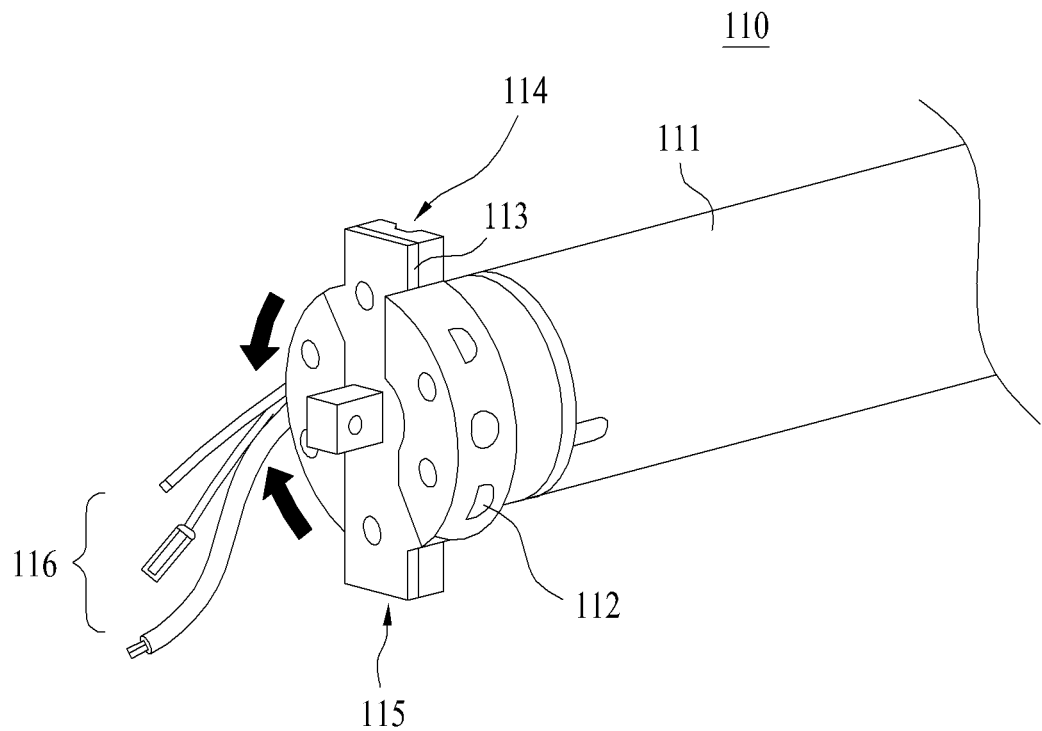

[Fig. 2]
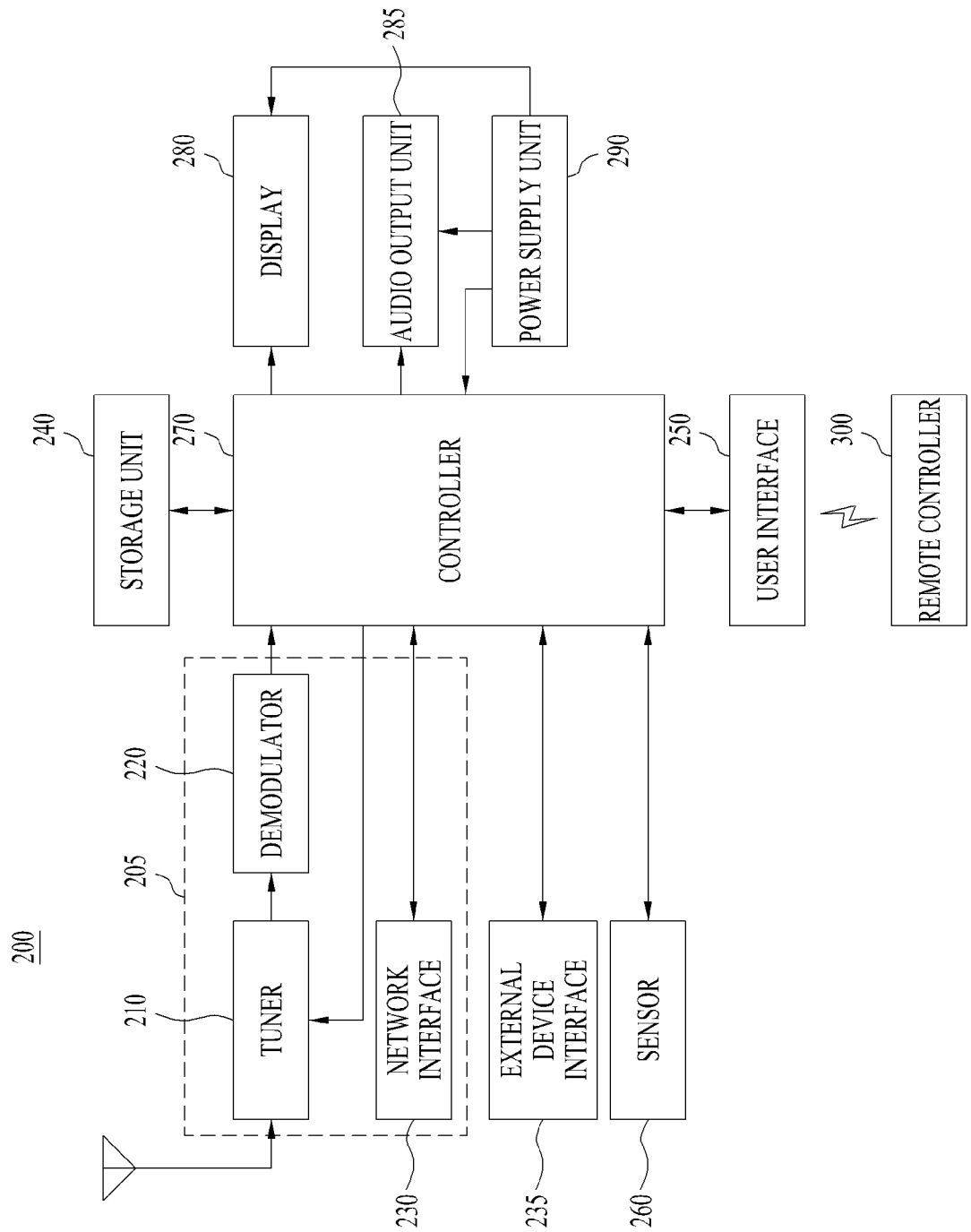

[Fig. 3]
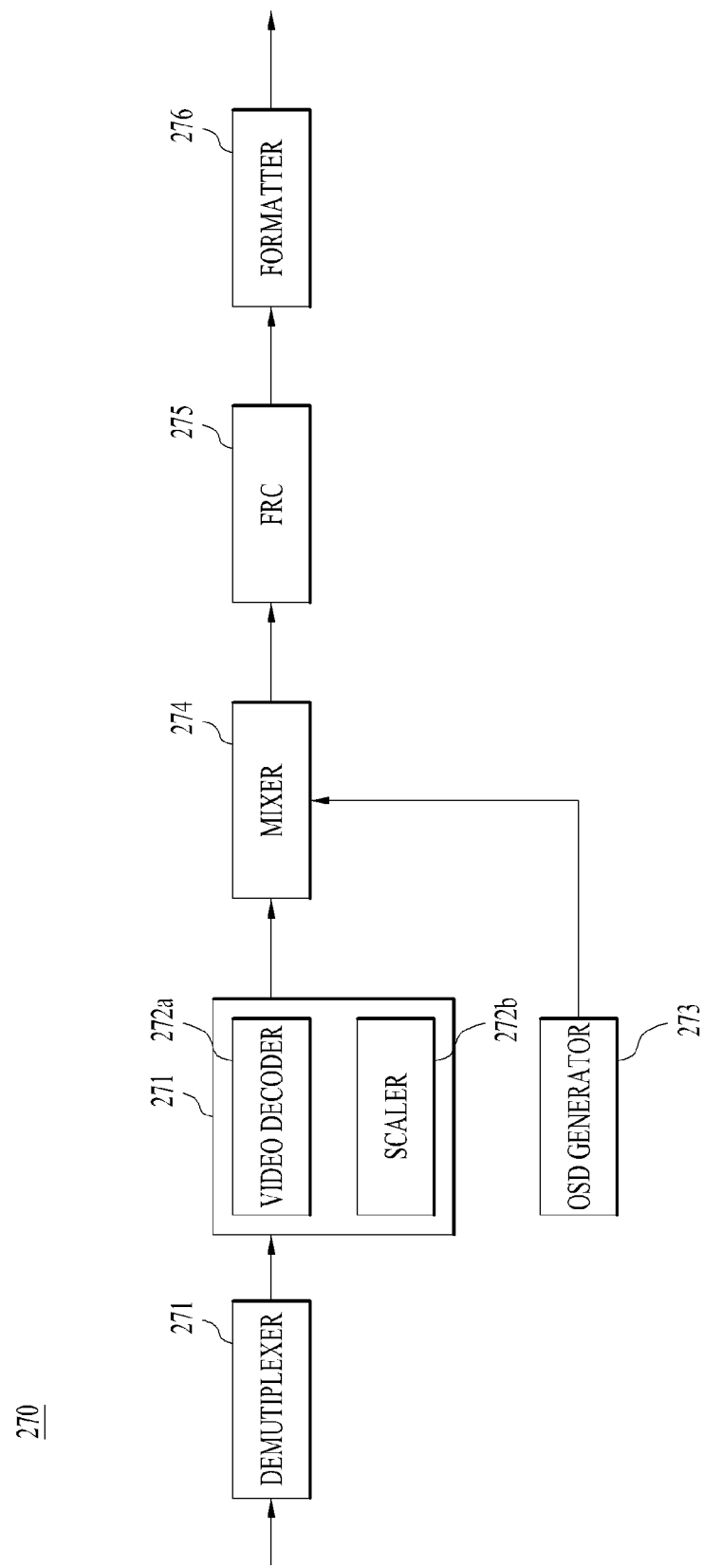

[Fig. 4]
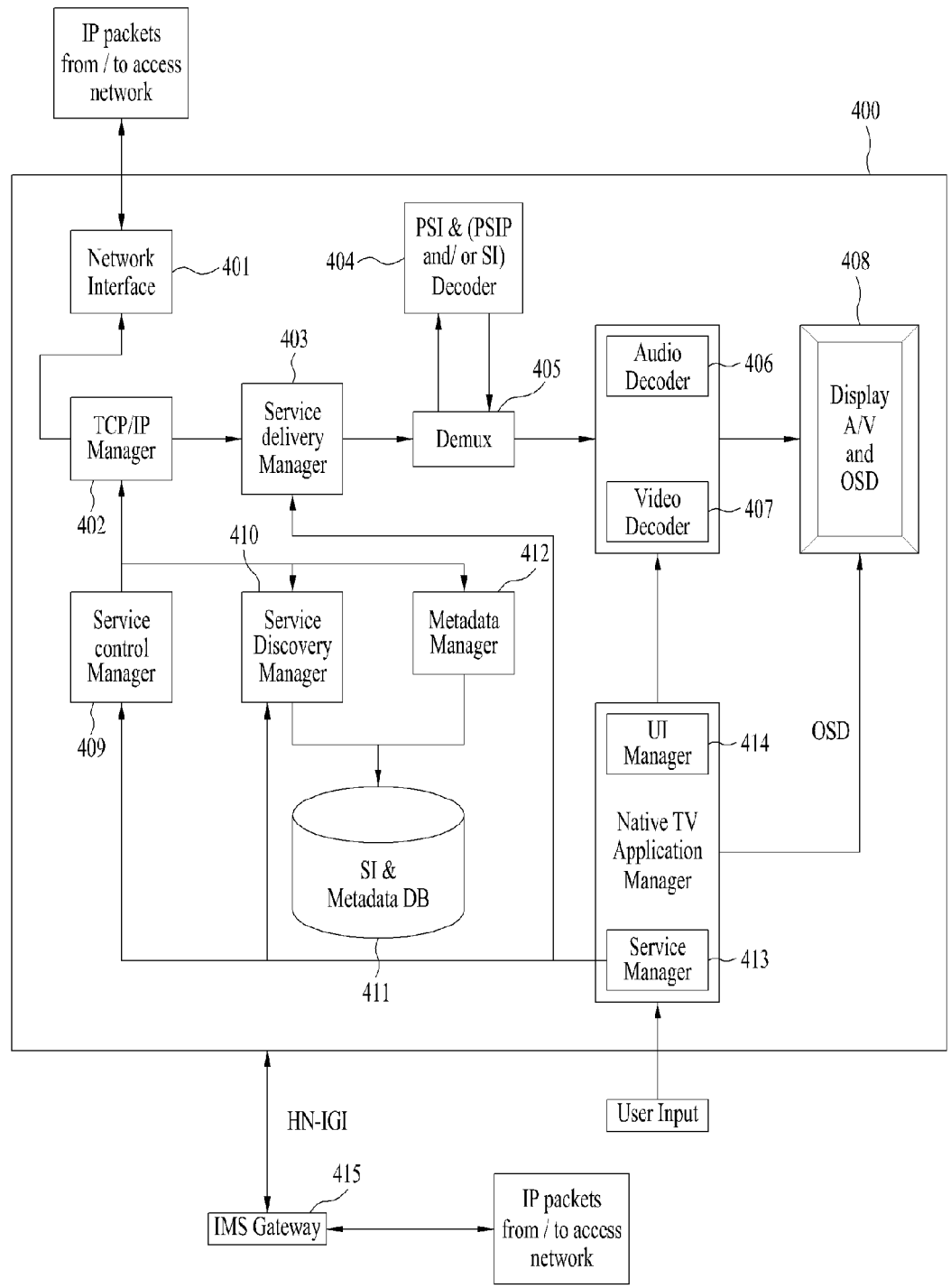

[Fig. 5]
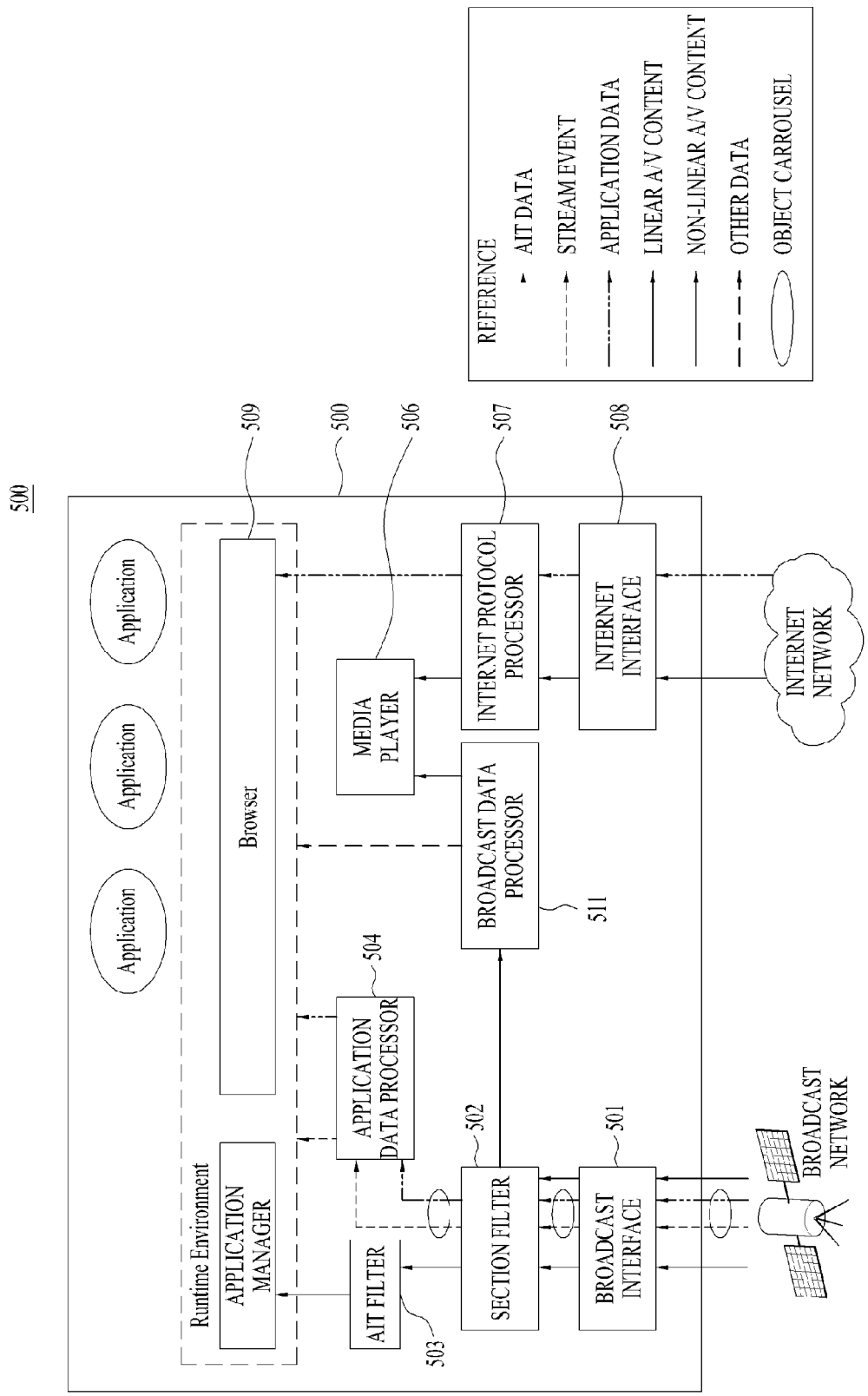

[Fig. 6]
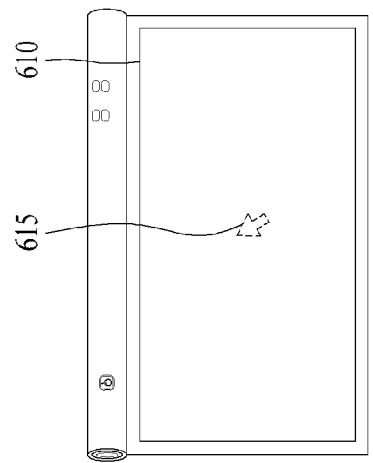
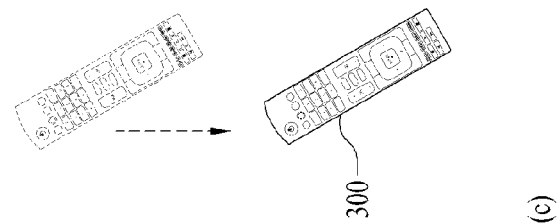
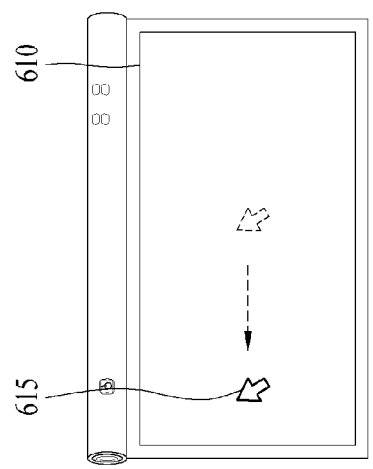
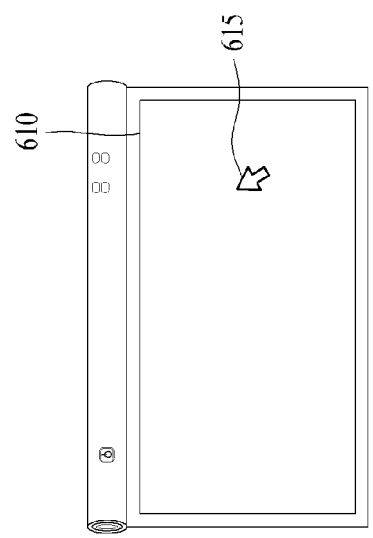
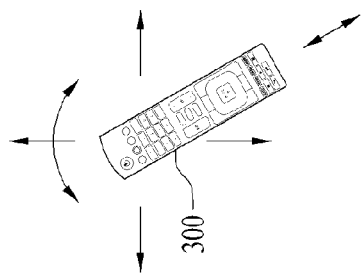

[Fig. 7]
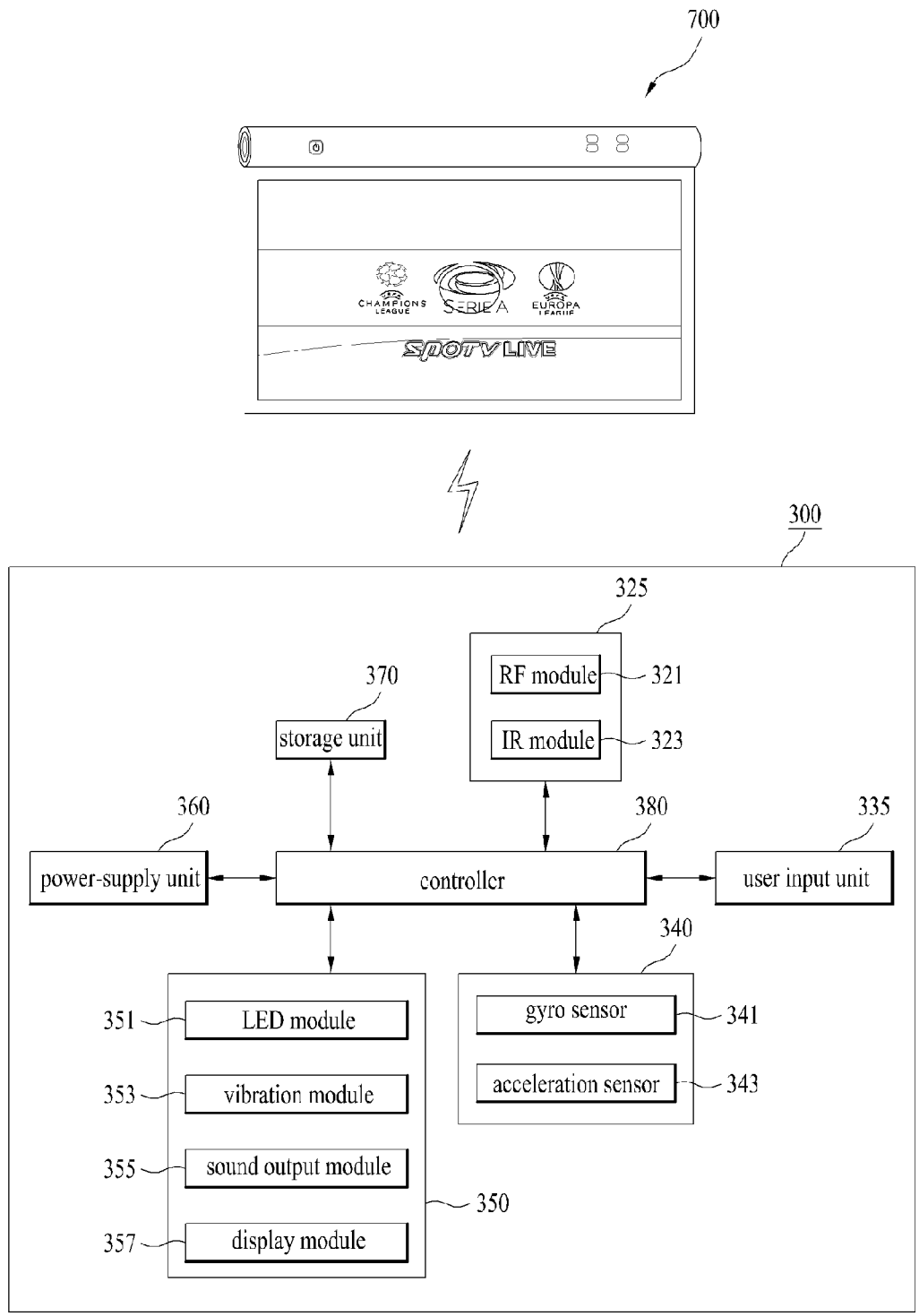

[Fig. 8]
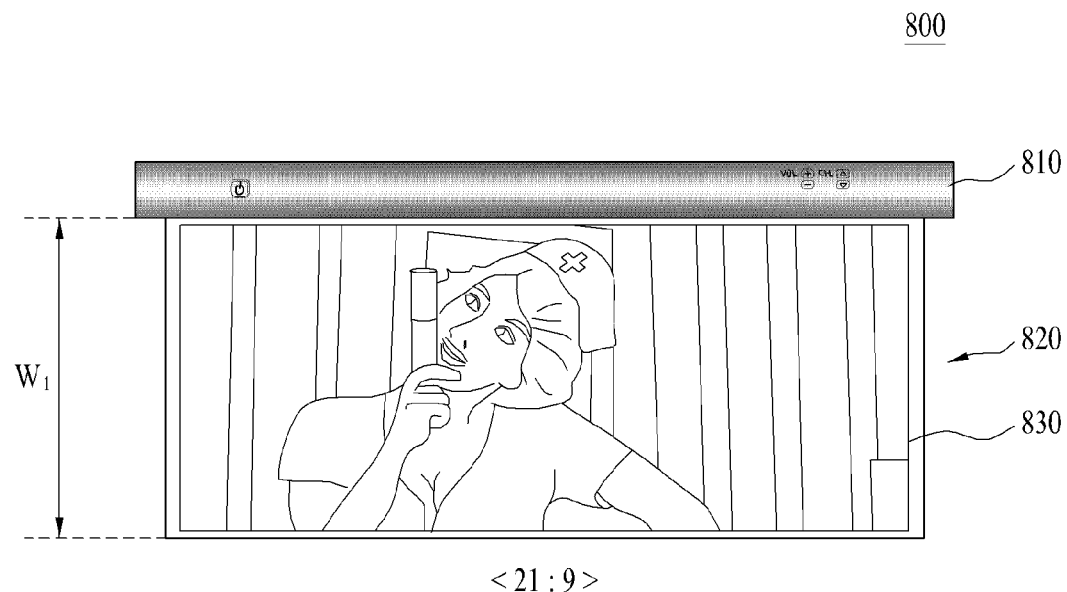
< 21 : 9 >
[Fig. 9]
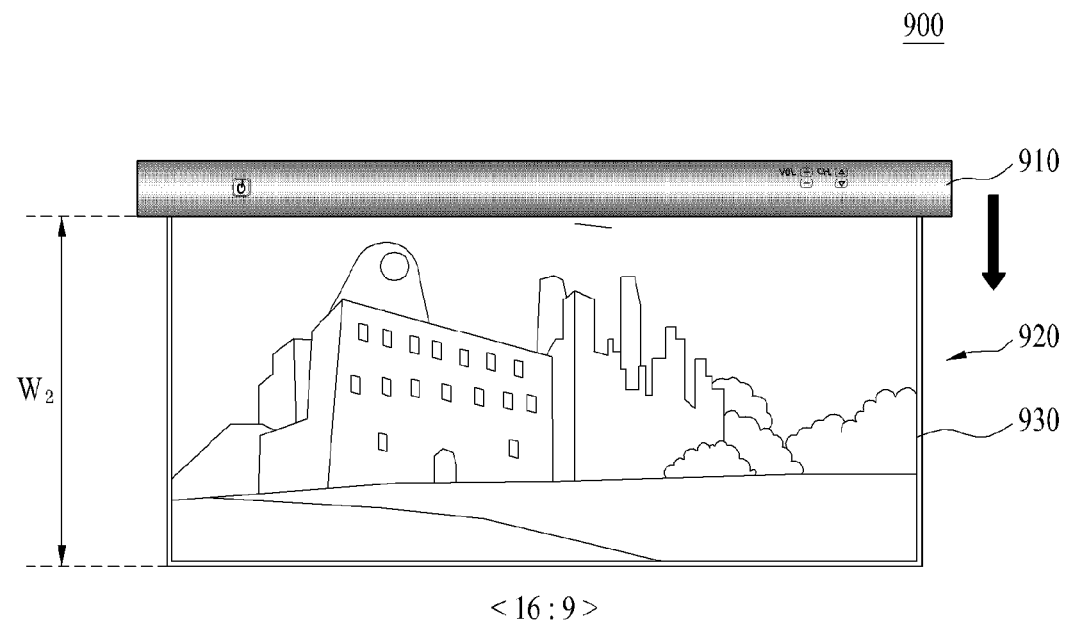
< 16 : 9 >

[Fig. 10]
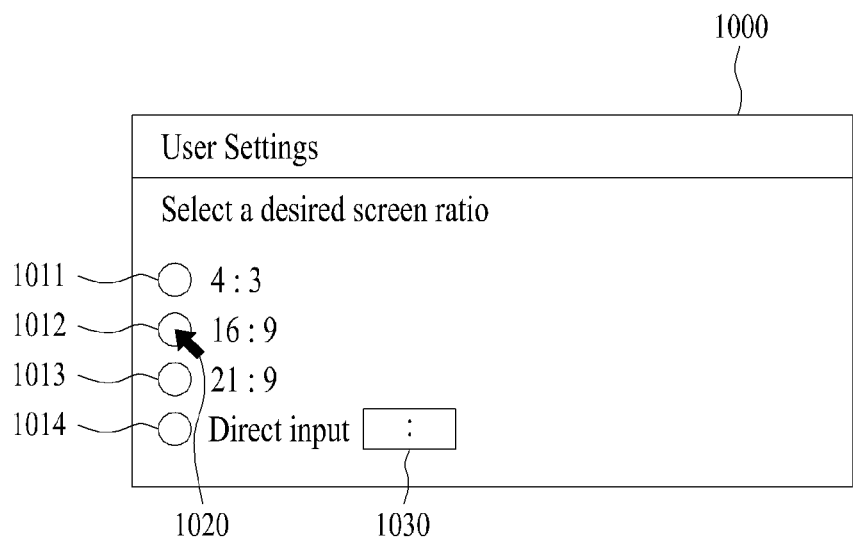
[Fig. 11]
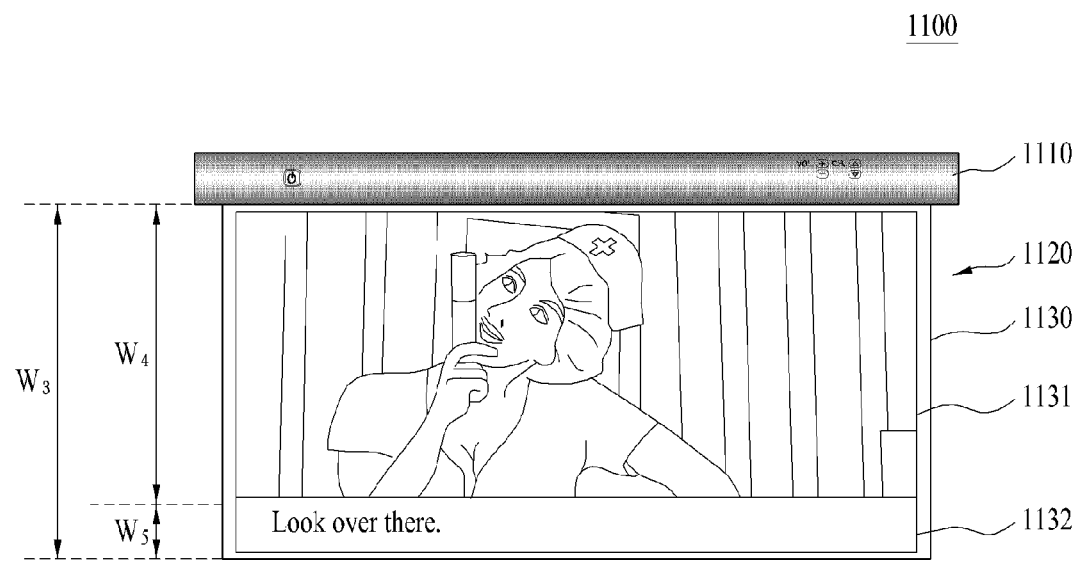

[Fig. 12]
[Fig. 13]
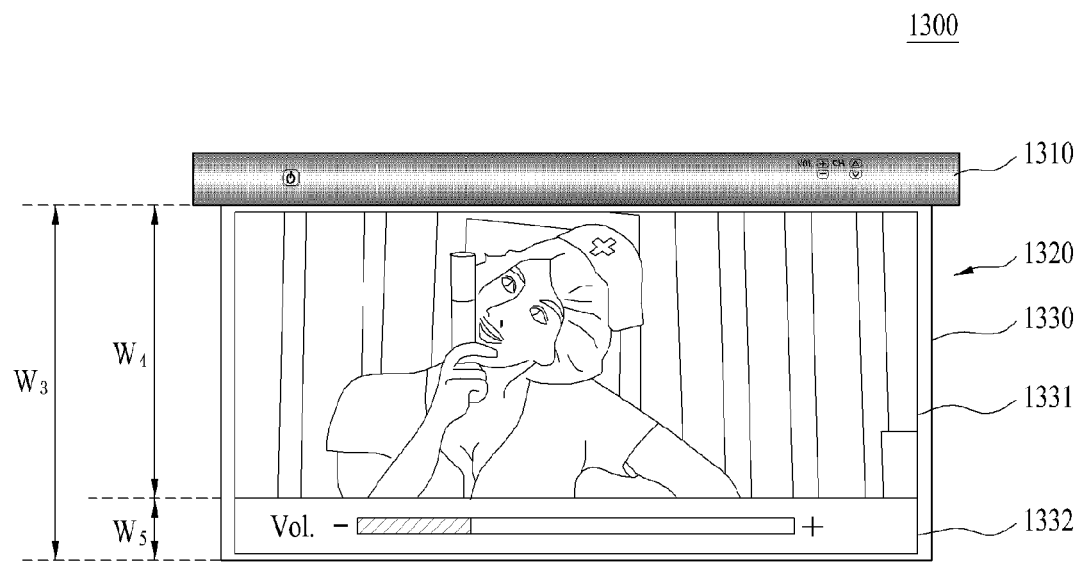

[Fig. 14]
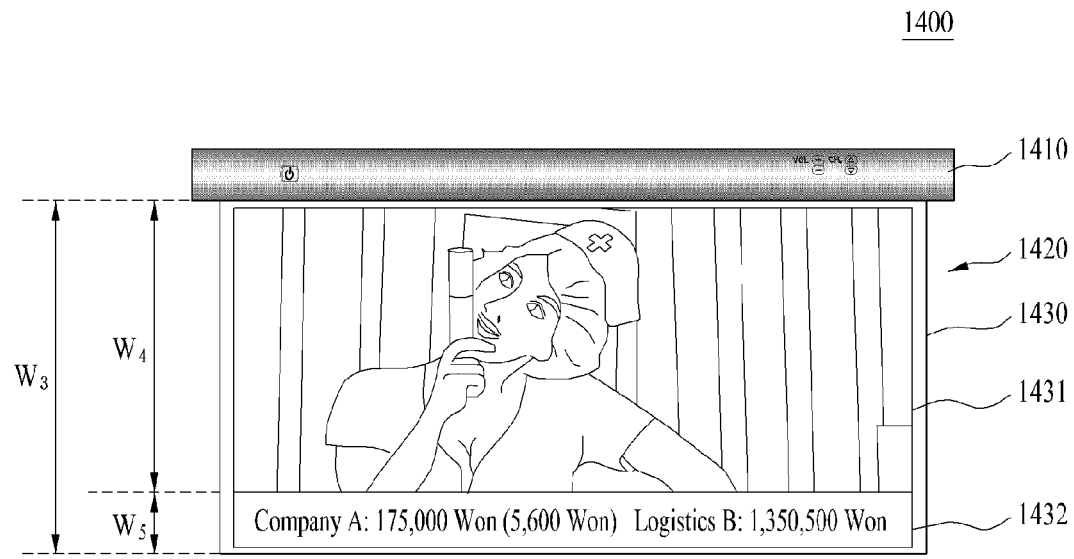
[Fig. 15]
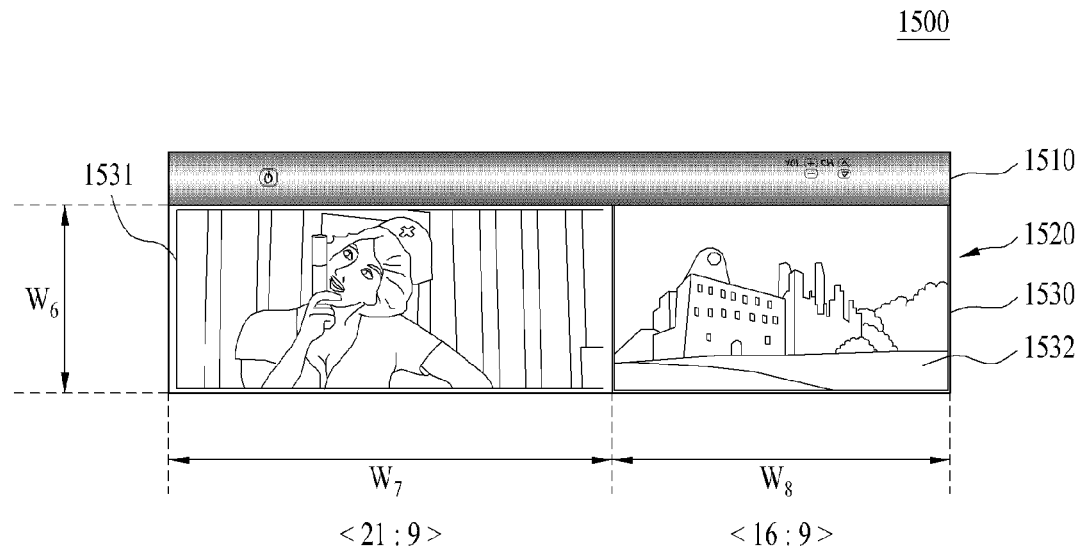

[Fig. 16]
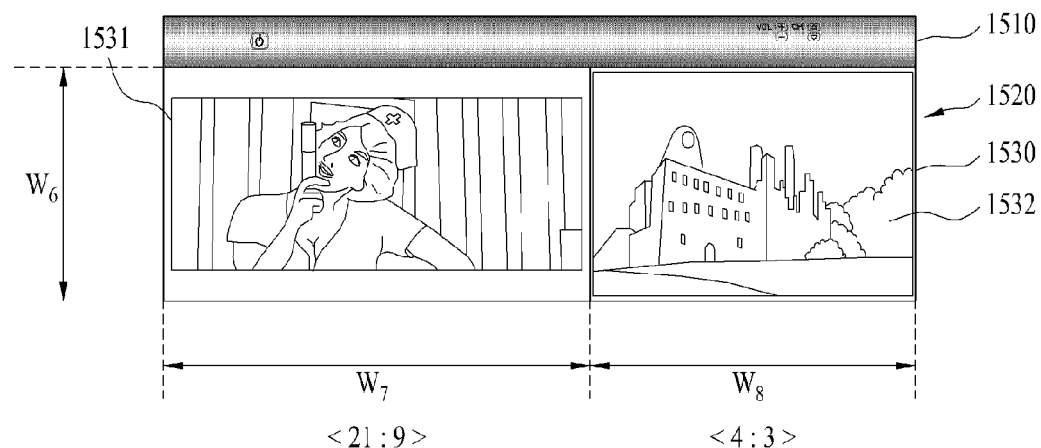
[Fig. 17]
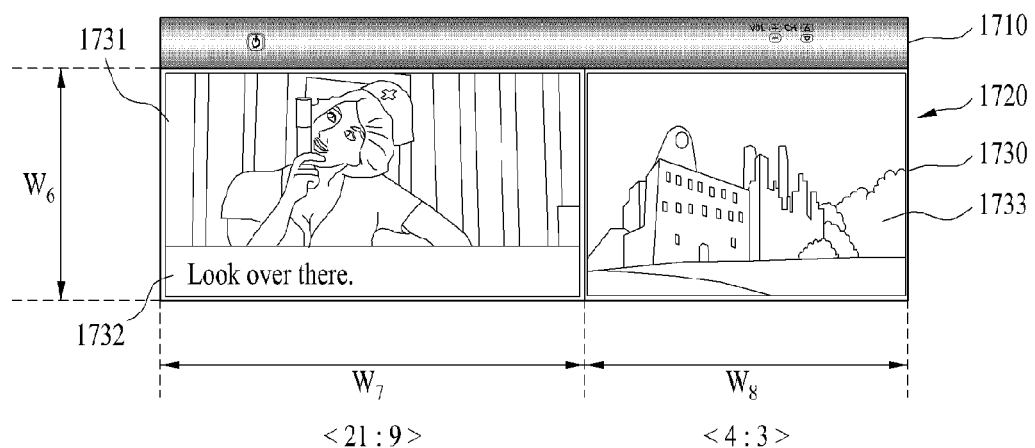
[Fig. 18]
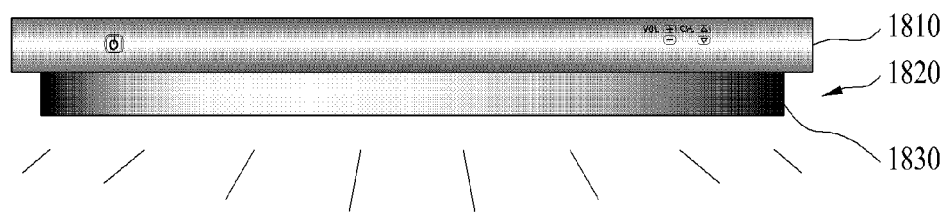

[Fig. 19]
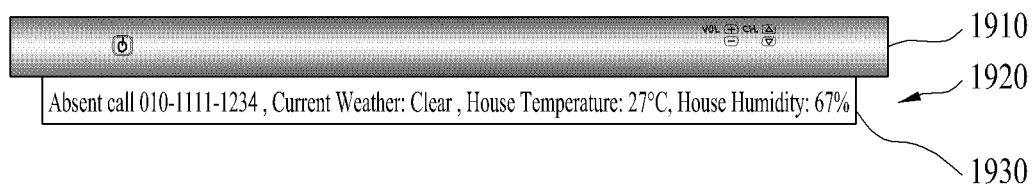
[Fig. 20]
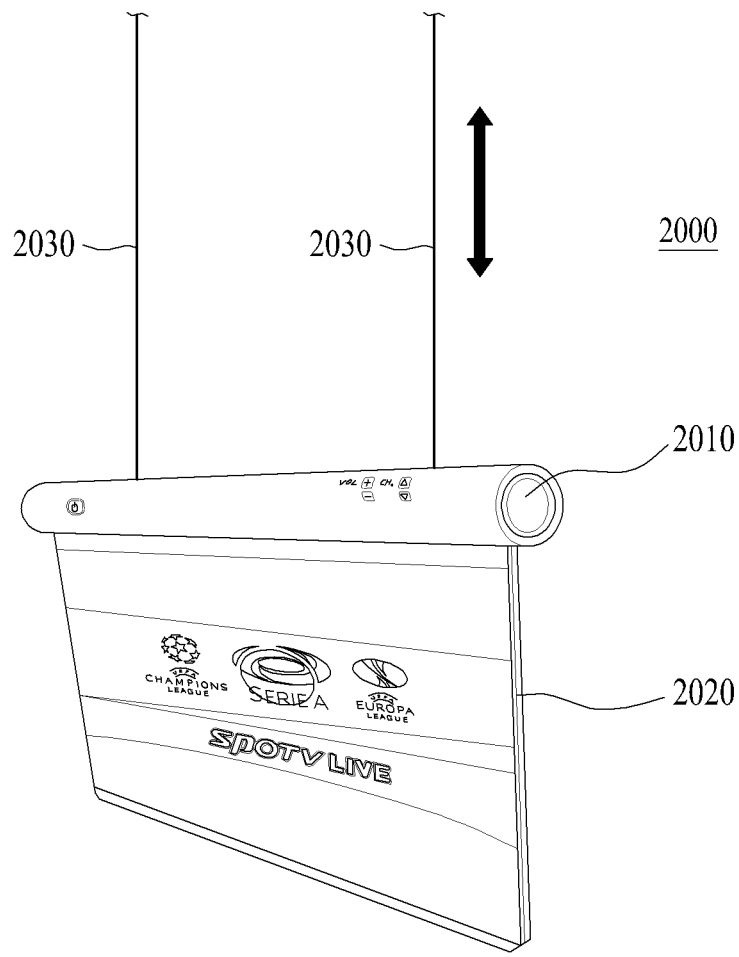

[Fig. 21]
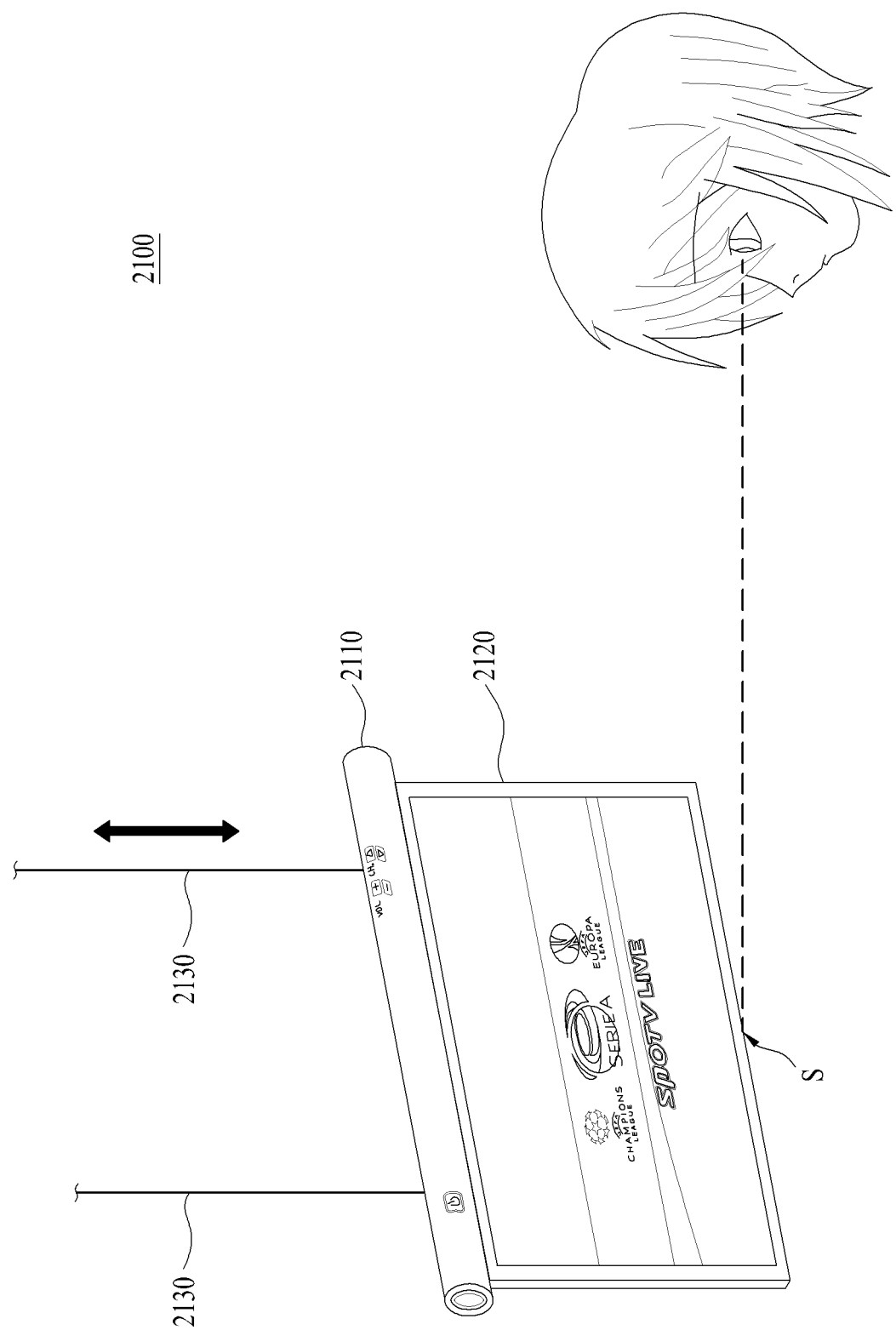

[Fig. 22]
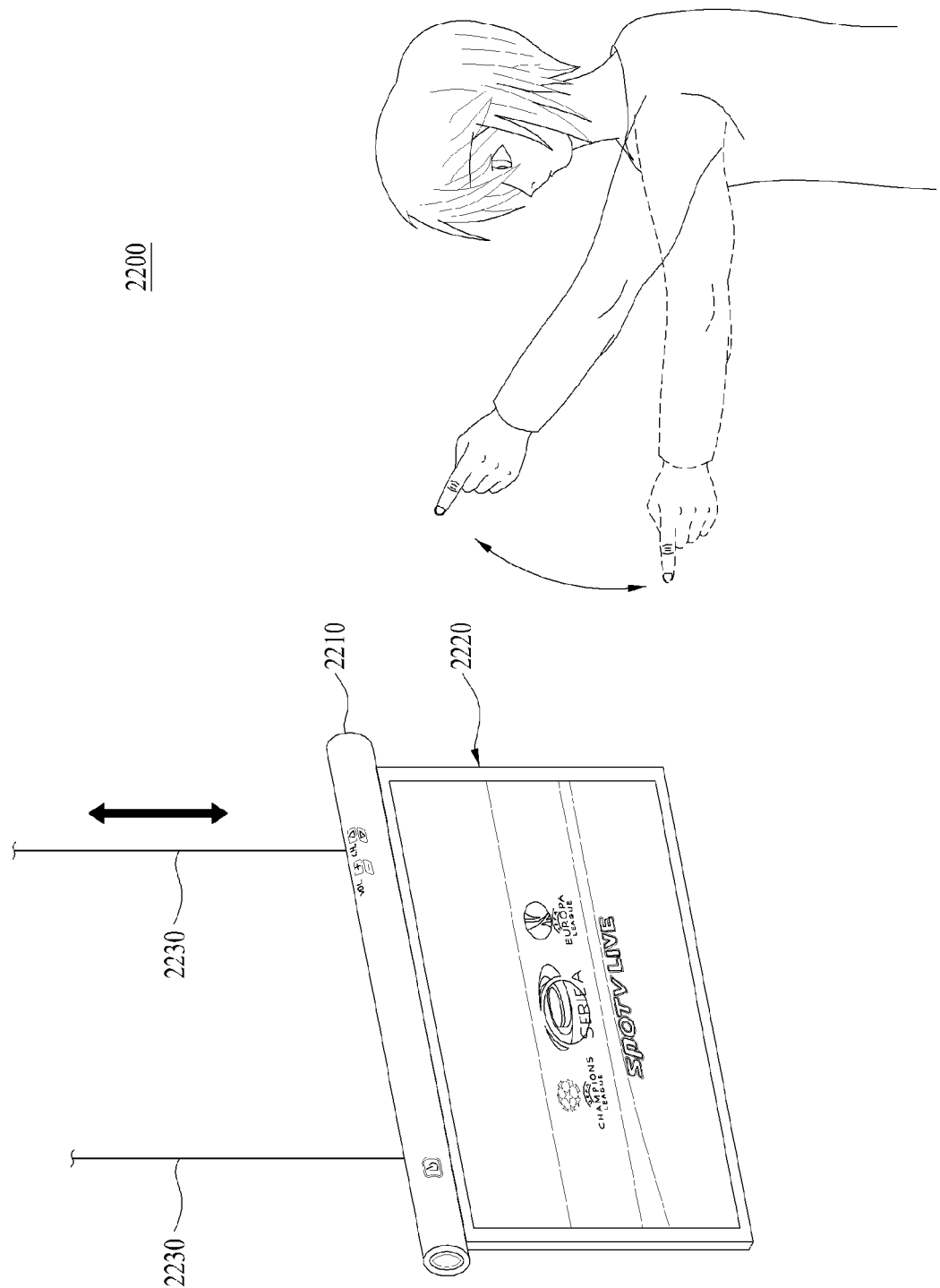

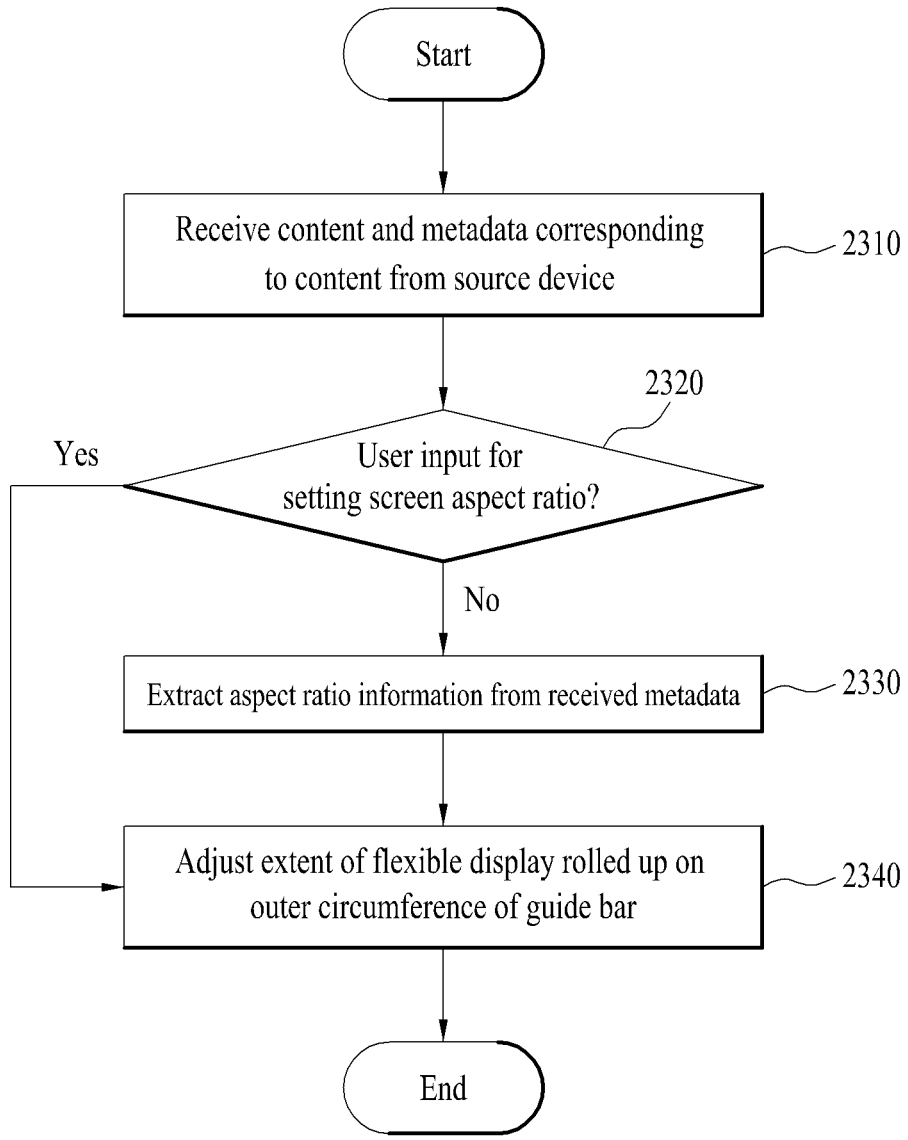
[Fig. 23]

MULTIMEDIA DEVICE HAVING FLEXIBLE DISPLAY AND CONTROLLING METHOD THEREOF

TECHNICAL FIELD

The present invention relates to a multimedia device and controlling method thereof, and more particularly, to a multimedia device including a flexible display and controlling method thereof. Although the present invention is suitable for a wide scope of applications, it is particularly suitable for rolling up the flexible display. For example, the multimedia device may include one of a network TV, a smart TV, a hybrid broadcast broadband television (HBBTV), and internet TV, a web TV, an internet protocol television (IPTV) and the like.

BACKGROUND ART

Generally, a multimedia device is equipped with a function of receiving and processing a user-viewable broadcast image. Recently, analog broadcasting tends to be replaced by digital broadcasting in many countries including Republic of Korea and the like.

Digital broadcasting means the broadcasting of transmitting digital video and audio signals. Since the digital broadcasting is stronger against external noise than the analog broadcasting, the digital broadcasting has data loss less than that of the analog broadcasting. The digital broadcasting is more advantageous than the analog broadcasting in error correction. The digital broadcasting has resolution higher than that of the analog broadcasting. And, the digital broadcasting provides a screen image clearer than that of the analog broadcasting. Moreover, the digital broadcasting is capable of interactive services unlike the analog broadcasting. Recently, there are many ongoing discussions on a smart TV in which an image display device function and a multimedia device function are integrated or combined with each other.

Meanwhile, hard types of displays have been mainly used. However, since it is impossible to change an exterior shape of a hard type display, a blank is left on top, bottom, right and/or left side of a screen depending on an aspect ratio of a content displayed on the display, whereby immersion in the content is disturbed. Recently, a flexible display, which can be bent or curved, is ready to be commercialized.

SUMMARY OF THE INVENTION

Accordingly, the present invention is directed to a multimedia device and controlling method thereof that may substantially obviate one or more of the problems due to limitations and disadvantages of the related art.

An object of the present invention is to provide a multimedia device and controlling method thereof, by which a solution for adjusting a screen region in a display to fit into an optimized aspect ratio of a content can be provided.

[Another object of the present invention is to provide a multimedia device and controlling method thereof, by which a solution for adjusting a height of a display to fit into a user's eye height can be provided.

A further object of the present invention is to provide a method of utilizing a display in a standby mode of a multimedia device.

Technical tasks obtainable from the present invention are non-limited the above mentioned effect. And, other unmentioned technical tasks s can be clearly understood from the following description by those having ordinary skill in the technical field to which the present invention pertains.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a multimedia device according to one embodiment of the present invention includes a guide bar, a flexible display configured to be rolled up on an outer circumference of the guide bar, the flexible display having a first region rolled up on the outer circumference of the guide bar and a second region not rolled up on the outer circumference of the guide bar, a receiving unit configured to receive a content and metadata corresponding to the content from a source device, and a control unit adjusting a vertical width of the second region of the flexible display in accordance with a preset condition.

To further achieve these and other advantages and in accordance with the purpose of the present invention, a method of controlling a multimedia device, which includes a guide bar and a flexible display configured to be rolled up on an outer circumference of the guide bar, according to another embodiment of the present invention includes the steps of receiving a content and metadata corresponding to the content from a source device, extracting an aspect ratio information from the received metadata, and adjusting an extent of the flexible display rolled up on the outer circumference of the flexible display in accordance with the extracted aspect ratio information.

To further achieve these and other advantages and in accordance with the purpose of the present invention, a method of controlling a multimedia device, which includes a guide bar and a flexible display configured to be rolled up on an outer circumference of the guide bar, according to a further embodiment of the present invention includes the steps of receiving a content and metadata corresponding to the content from a source device, receiving a command signal for selecting an aspect ratio of a screen in the flexible display, and adjusting an extent of the flexible display rolled up on the outer circumference of the flexible display in accordance with the received command signal.

It is to be understood that both the foregoing general description and the following detailed description are exemplary and explanatory and are intended to provide further explanation of the invention as claimed.

Accordingly, the present invention provides the following effects and/or features.

First of all, according to one embodiment of the present invention, a solution for adjusting a screen region in a display to fit into an optimized aspect ratio of a content is provided.

Secondly, according to another embodiment of the present invention, a solution for adjusting a height of a display to fit into a user's eye height is provided.

Thirdly, according to a further embodiment of the present invention, a method of utilizing a display in a standby mode of a multimedia device is provided.

Effects obtainable from the present invention are non-limited the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures as follows.

FIG. 1a is a diagram for one example of a multimedia device including a flexible display according to one embodiment of the present invention.

FIG. 1b is a diagram of a portion of a guide bar included in the multimedia device shown in FIG. 1a.

FIG. 2 is a diagram of component modules of a multimedia device according to one embodiment of the present invention.

FIG. 3 is a detailed diagram of component modules of a control unit shown in FIG. 2.

FIG. 4 is a diagram for another example of component modules of a multimedia device including a flexible display according to one embodiment of the present invention.

FIG. 5 is a diagram for a further example of component modules of a multimedia device including a flexible display according to one embodiment of the present invention.

FIG. 6 is a diagram of an exterior of a remote controller configured to control a multimedia device including a flexible display according to one embodiment of the present invention.

FIG. 7 is a detailed diagram of inner component modules of a remote controller configured to control a multimedia device including a flexible display according to one embodiment of the present invention.

FIG. 8 is a diagram of a multimedia device according to one embodiment of the present invention.

FIG. 9 is a diagram of a multimedia device according to another embodiment of the present invention.

FIG. 10 is a diagram for one example of a GUI displayed on a screen in a multimedia device according to another embodiment of the present invention.

FIG. 11 is a diagram of a multimedia device according to another embodiment of the present invention.

FIG. 12 is a diagram of a multimedia device according to another embodiment of the present invention.

FIG. 13 is a diagram of a multimedia device according to another embodiment of the present invention.

FIG. 14 is a diagram of a multimedia device according to another embodiment of the present invention.

FIG. 15 and FIG. 16 are diagrams of a multimedia device according to another embodiment of the present invention.

FIG. 17 is a diagram of a multimedia device according to another embodiment of the present invention.

FIG. 18 is a diagram of a multimedia device according to a further embodiment of the present invention.

FIG. 19 is a diagram of a multimedia device according to another further embodiment of the present invention.

FIG. 20 is a diagram to describe one example of adjusting a height of a multimedia device according to one embodiment of the present invention.

FIG. 21 is a diagram for one example of a multimedia device having a sensor according to one embodiment of the present invention.

FIG. 22 is a diagram for another example of a multimedia device having a sensor according to one embodiment of the present invention.

FIG. 23 is a flowchart for a method of controlling a multimedia device according to one embodiment of the present invention.

DETAILED DESCRIPTION OF THE EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

Meanwhile, a display device described in the present specification is an intelligent network TV additionally equipped with a computer supportive function. In particular, the display device fully supports a broadcast receiving function and has an internet function and the like added thereto. Hence, the display device can have such a facilitated interface as a handwritten input device, a touchscreen, a space remote controller and the like. And, the display device is connected to internet and computer with the support of wired/wireless internet function and can perform functions of email, web browsing, banking, game and the like. For the various function, a standardized universal operation system (OS) can be used.

And, since various applications can be freely added to or deleted from a universal OS kernel, a display device mentioned in the description of the present invention can perform various kinds of user-friendly functions.

Moreover, although reference will now be made in detail to the preferred embodiments of the present invention, examples of which are illustrated in the accompanying drawings, the present invention may be non-limited by the preferred embodiments of the present invention.

First of all, although terminologies used in the present specification are selected from general terminologies used currently and widely in consideration of functions in the present invention, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the invention. Therefore, terminologies used in the present specification need to be construed based on the substantial meanings of the corresponding terminologies and the overall matters disclosed in the present specification rather than construed as simple names of the terminologies.

FIG. 1a is a diagram for one example of a multimedia device including a flexible display according to one embodiment of the present invention. FIG. 1b is a diagram of a portion of a guide bar included in the multimedia device shown in FIG. 1a. One example of a multimedia device including a flexible display according to one embodiment of the present invention is described with reference to FIG. 1a and FIG. 1b as follows.

Referring to FIG. 1a, a multimedia device 100 according to one embodiment of the present invention includes a guide bar 110 and a flexible display 120.

The guide bar 110 is configured in a rod shape having a length direction. For instance, the guide bar 110 may be formed in a cylindrical shape. Yet, no limitations are put on the shape of the guide bar 110. And, the multimedia device 100 may further include a housing configured to enclose an outside of the guide bar 110.

The flexible display 120 is supported by the guide bar 110 and can be rolled up on an outer circumference of the guide bar 110. A size of a screen 122 of the flexible display 120 can be adjusted depending on a size of a portrait length of the flexible display 120 wound on the outer circumference of the guide bar 110. In particular, if an extent of the flexible display 120 rolled up on the outer circumference of the guide bar 110 increases, the size of the screen 122 decreases correspondingly. If an extent of the flexible display 120 rolled up on the outer circumference of the guide bar 110 decreases, the size of the screen 122 increases correspondingly. In this case, the screen 122 means a part of the flexible display 120, on which video data, image data, text data and the like are displayed. In particular, the screen 122 may be situated within a region of the flexible display 120 failing to be rolled up on the outer circumference of the guide bar 110.

In case that a user does not use the multimedia device 100 for long term, the flexible display 120 is facilitated to be stored in a manner of being fully rolled up on the outer circumference of the guide bar 110.

A motor (not shown in the drawing) is built in the guide bar 110 to roll up the flexible display 120 on the outer circumference of the guide bar 110. Once the motor starts to rotate, the guide bar 110 connected to the motor rotates to adjust an extent of rolling up the flexible display 120 supported by the guide bar 110 on the outer circumference of the guide bar 110. Referring to FIG. 1b, the guide bar 110 may include a first part 111 configured to support the flexible display 120, a second part 112 provided to both end portions of the first part 111 in a manner of having a motor built therein, and a third part 113 locked to the second part 112. The first part 111 is locked to one end of the flexible display 120 and is designed to have the flexible display 120 rolled up on its outer circumference while the first part 111 supports the flexible display 120. As the second part 112 having the motor built therein rotates, the first part 111 rotates together with the second part 112. If the first part 111 rotates, it is able to adjust an extent of rolling up the flexible display 120. The 3rd part 113 is the part locked to a string (cf. a reference number 2030 shown in FIG. 20) that will be explained later. And, a distance detection sensor may be provided to each of a top side 114 and a bottom side 115 of the third part 113. Conducting lines 116 including RF antenna, A/V cable, power cable and the like can be connected to the guide bar 110.

For instance, the flexible display 120 may include an organic light emitting diode (OLED).

FIG. 2 is a diagram of component modules of a multimedia device according to one embodiment of the present invention. In the following description, component modules of a multimedia device according to one embodiment of the present invention are explained with reference to FIG. 2. Yet, FIG. 2 shows one embodiment for clarity of the following description. If the embodiment includes other component modules as well as the former component modules shown in FIG. 2 or the former component module(s) shown in FIG. 2 is omitted in part, it may belong to the scope of the appended claims and their equivalents. Moreover, the multimedia device 200 may correspond to the former multimedia device 100 shown in FIG. 1a. Besides, if some of the component modules shown in FIG. 2 are separated from a display unit 280 in form of STB (set-top box), it may belong to the scope of the appended claims and their equivalents.

Referring to FIG. 2, a multimedia device 200 according to one embodiment of the present invention may include a receiving unit 205, an external device interface unit 235, a storage unit 240, a user interface unit 250, a sensor unit 260, a control unit 270, a display unit 2380, an audio output unit 285, a power supply unit 290 and a photographing unit (not shown in the drawing).

The receiving unit 205 may include a tuner 210, a demodulator 220 and a network interface 230. Optionally, if necessary, the receiving unit 205 can be designed to include the tuner 210 and the demodulator 220 without the network interface 230. On the contrary, the receiving unit 205 can be designed to include the network interface 230 without the tuner 210 and the demodulator 220.

The tuner 210 selects an RF (radio frequency) broadcast signal, which corresponds to a channel selected by a user or all of the saved channels, from RF broadcast signal received via an antenna. The demodulator 220 receives a digital IF signal (DIF) transformed by the tuner 210 and then performs a demodulating operation thereon.

The demodulator 220 performs demodulation and channel decoding and is then able to output a stream signal TS. In this case, the stream signal may include a signal in which a video signal, an audio signal and/or a data signal are multiplexed with each other. For instance, the stream signal may include an MPEG-2 TS (transport stream) in which an MPEG-2 video signal, a Dolby AC-3 audio signal and the like are multiplexed with each other. In particular, the MPEG-2 TS can include a 4-byte header and a 184-byte payload.

The stream signal outputted from the demodulator 220 can be inputted to the control unit 270. Subsequently, the control unit 270 performs demultiplexing, video/audio signal processing and the like and then outputs a video and an audio to the display unit 280 and the audio output unit 285, respectively. And, the display unit 280 may correspond to the flexible display shown in FIG. 1a.

The external device interface unit 235 can connect the multimedia device 200 to an external device. To this end, the external device interface unit 235 can include an A/V input/output unit (not shown in the drawing) or a wireless communication unit (not shown in the drawing).

The external device interface unit 235 204 may be connected by wire/wireless to such an external device as a DVD (digital versatile disk), a BD (Blu-ray disc) player, a game device, a camera, a camcorder, a computer (e.g., laptop, etc.) and the like. Meanwhile, the external device interface unit 235 receives an application or an application list in a neighbor external device and is then able to deliver it to the control unit 270 or the storage unit 240.

The network interface 230 may include an Ethernet terminal and the like for an access to a wired network for example. And, for the connection to a wireless network, the network interface 230 may use such a communication protocol as WLAN (wireless LAN: Wi-Fi), Wibro (wireless broadband), Wimax (world interoperability for microwave access), HSPDA (high speed downlink packet access) and the like for example. And, the network interface 230 selects a desired application from applications open to the public via a network and is then able to receive the selected application.

The storage unit 240 may store programs for signal processing and control within the control unit 270. And, the storage unit 240 may store a signal processed audio, video or data signal.

The storage unit 240 may perform a function for temporary storage of an audio, video or data signal inputted from the external device interface unit 235 or the network interface 230. Moreover, the storage unit 240 may store the application or the application list inputted from the external device interface unit 235 or the network interface 230.

The user interface unit 250 forwards a signal inputted by a user to the control unit 270. The user interface unit 250 forwards a signal from the control unit 270 to the user. For instance, the user interface unit 240 receives and processes a control signal for power-on/off, channel selection, screen settings or the like from the remote controller 300 by such a communication protocol as RF (radio frequency) communication protocol, infrared (IR) communication protocol and the like. And, the user interface unit 250 transmits a control signal from the control unit 270 to the remote controller 300.

The control unit 270 may generate and output a signal for a video or audio output in a manner of demultiplexing a stream inputted via the tuner 210, the demodulator 220 or the external device interface unit 235 or processing demultiplexed signals.

The video signal video-processed by the control unit 270 is inputted to the display unit 280 and can be then displayed as a video or image corresponding to the inputted video signal. And, the video signal video-processed by the control unit 270 can be inputted to an external output device via the external device interface unit 235. The audio signal processed by the control unit 270 is inputted to the audio output unit 285. And, the audio signal processed by the control unit 270 can be inputted to the external output device via the external device interface unit 235.

The display unit 280 generates a drive signal by converting the video, data and OSD signals processed by the control unit 270, or the video and data signals received from the external device interface unit 235 to R/G/B signals. The display unit 280 includes a flexible display that can be bent or curved. And, the display unit 280 may include OLED (organic light emitting diode). In case that a graphic user interface (GUI) for a user input is displayed on a screen of the display unit 280, the display unit 280 can play a role as a user interface unit as well as a role an output unit.

The audio output unit 285 outputs an audio by receiving an input of stereo signal, 3.1-channel signal or 5.1-channel signal, which is audio-processed by the control unit 270, for example. And, the audio output unit 285 may be implemented with speakers of various types.

The power supply unit 290 supplies power to the multimedia device 200 overall. In particular, the power supply unit 290 can supply the power to the control unit 270 implemented into an SOC (system on chip) type, the display unit 280 for the image or video display, and the audio output unit 285 for the audio output.

The sensor unit 260 can include at least one of an eye recognition sensor for recognizing a user's eye, a motion recognition sensor for recognizing a user's motion, a voice recognition sensor for recognizing a user's voice and the like.

The remote controller 300 transmits a user input to the user interface unit 250. To this end, the remote controller 300 can use Bluetooth, RF (radio frequency) communication, IR communication, UWB (ultra wideband), Zigbee and the like. Particularly, the remote controller 300 shall be described in detail with reference to FIG. 6 and FIG. 7 later.

The tuner 210 receives AV data of a broadcast program. And, the tuner 210 can be replaced by a broadcast network interface.

The network interface 230 receives a content and metadata corresponding to the content from each source device. In this case, the source device means a broadcasting station, a contents provider, a service provider or the like. And, the network interface 230 can be designed as an internet network interface for example.

FIG. 3 is a detailed diagram of component modules of a control unit shown in FIG. 2. In the following description, component modules of the control unit in the multimedia device according to one embodiment of the present invention are explained.

Referring to FIG. 3, the control unit 270 according to one embodiment of the present invention may include a demultiplexer 271, a video processor 272, an OSD generator 273, a mixer 274, a frame rate converter 275 (FRC) 275 and a formatter 276. And, the control unit 270 may further include an audio processor (not shown in the drawing) and a data processor (not shown in the drawing).

The demultiplexer 271 may demultiplex an inputted stream. The video processor 272 may perform a video processing on a demultiplexed video signal. To this end, the video processor 272 may further include a video decoder 272a and a scaler 272b.

The video decoder 272a decodes the demultiplexed video signal and the scaler 272b performs a scaling to enable resolution of the decoded video signal to be outputtable from the display unit 280. And, the video signal decoded by the video processor 272 is inputted to the mixer 274.

The OSD generator 273 generates an OSD signal in response to a user input or by itself. For instance, the OSD generator 273 can generate a signal for displaying various information as a graphic or text on a screen of the display unit 280 based on a control signal from the user interface unit 250.

The mixer 274 mixes the OSD signal generated from the OSD generator 273 and the decoded video signal video-processed by the video processor 272 with each other. The mixed signal is provided to the formatter 276. Since a decoded broadcast video signal or an external input signal and an OSD signal are mixed together, an OSD may be displayed in a manner of overlaying a broadcast video or an external input video.

The frame rate converter (FRC) 275 can convert a frame rate of an inputted video. For instance, the frame rate converter 275 converts a frame rate to 120 or 240 Hz from 60 Hz. In case that the frame rate of 60 Hz is converted to 120 Hz, it is possible to insert a first frame between the first frame and a second frame or insert a third frame, which is predicted from the first frame and the second frame, between the first frame and the second frame. In case of converting a frame rate of 60 Hz to 240 Hz, it is possible to insert 3 frames of the same or 3 predicted frames. Meanwhile, it is possible to maintain an inputted frame rate without separate conversion.

The formatter 276 receives an input of an output signal of the frame rate converter 275 and then outputs the signal by changing a format of the signal to fit the display unit 280. For instance, the formatter 276 can output R/G/B data signal. In this case, the R/G/B data signal may be outputted as low voltage differential signaling (LVDS) or mini-LVDS.

Particularly, a multimedia device including a flexible display according to one embodiment of the present invention is described as follows.

First of all, the display unit 280 includes a flexible display and can be rolled up on an outer circumference of a guide bar (not shown in the drawing). In the display unit 280, a part rolled up on the outer circumference of the guide bar shall be named a first region and a part failing to be rolled up on the outer circumference of the guide bar shall be named a second region. Since the display unit 280 can be rolled up on the outer circumference of the guide bar, a size of each of the first and second regions may vary depending on an extent of the display unit 280 rolled up on the guide bar. In this case, a screen is situated within the second region failing to be rolled up on the outer circumference of the guide bar.

The receiving unit 205 receives a content and metadata corresponding to the content from a source device. In this case, the source device may include one of a broadcasting station, a contents provided, a service provider and the like. In this case, the contents may conceptionally include all contents, which include a broadcast signal, a VOD (video on demand), an application and the like, receivable from the source device. And, the metadata may include such information as a content name, a running time, an optimized resolution, an aspect ratio and the like.

The control unit 270 extracts an aspect ratio information of the content from the received metadata. In this case, the aspect ratio means a width to length ratio of a screen. Using the aspect ratio information, the control unit 270 can obtain a screen aspect ratio optimized for the received content.

In accordance with the extract aspect ratio information, the control unit 270 adjusts a vertical width of the second region of the flexible display. In particular, the control unit 270 adjusts the vertical width of the second region of the flexible display to fit the extracted aspect ratio, thereby enabling a user to watch the content on a full screen without a margin or blank. This shall be described in detail with reference to FIG. 8 and FIG. 9 later.

The adjustment of the vertical width of the second region of the flexible display is performed in a manner of adjusting an extent of the flexible display rolled up on the outer circumference of the guide bar. If the extent of the flexible display rolled up on the outer circumference of the flexible display increases, a size of the screen decreases correspondingly. If the extent of the flexible display rolled up on the outer circumference of the flexible display decreases, a size of the screen increases correspondingly. Since a horizontal width of the flexible display is already determined depending on a product, it is able to adjust a size of the screen by adjusting the vertical width of the flexible display.

Meanwhile, since a hard type display is used according to the related, a blank is left on top, bottom, right and/or left side of a screen depending on an aspect ratio of a screen. Hence, it may cause a problem that user's immersion is disturbed. Yet, according to the present invention, a size of a screen is controlled in a manner that a vertical width of a second region of a flexible display is adjusted depending on an aspect ratio optimized for a content, whereby a user can watch the content on a full screen without blanks or margins.

Occasionally, a user may desire to watch a content at an aspect ratio of a screen preferred by the user instead of watching the content at an aspect ratio indicated by an information of a received metadata. In this case, the control unit 270 generates a GUI for receiving a command signal for selecting an aspect ratio of a screen and then controls the generated GUI to be displayed on the flexible display. In particular, the OSD generator 273 in the control unit 270 generates a GUI signal for aspect ratio selection and then delivers the GUI signal to the display unit 280. If so, the GUI is displayed on the display unit 280. The control unit 270 adjusts the vertical width of the second region of the flexible display in response to a screen aspect ratio inputted via the GUI. This shall be described in detail with reference to FIG. 10 later.

The storage unit 240 may store a function or a lookup table for determining the vertical width of the second region in accordance with the screen aspect ratio in advance. In response to the screen aspect ratio, the control unit 270 detects the function by accessing the storage unit 240 and then determines the vertical width of the second region in accordance with the detected function. Alternatively, in response to the screen aspect ratio, the control unit 270 detects a value in the lookup table by accessing the storage unit 240 and then determines the vertical width of the second region in accordance with the detected value in the lookup table. The control unit 270 detects a width of the second region in a current state and is then able to determine whether to further roll up the flexible display on the outer circumference of the guide bar or release a rolled part of the flexible display from the outer circumference of the guide bar in accordance with the determined width of the second region.

The control unit 270 can determine whether caption data (subtitle image or text data), OSD data, widget application data or the like exists except video data included in the received content. For clarity, the caption data (subtitle image or text data), the OSD data, the widget application data or the like except video data shall be named subdata.

If a command signal for displaying the video data and the subdata separately is received through the received content itself or a user input, the control unit 270 partitions a screen within the flexible display and is then able to control the video data and the subdata to be displayed on a first partitioned region and a second partitioned region, respectively, in response to the received command signal. The OSD generator 273 in the control unit 270 converts the subdata to an OSD signal and is then able to deliver it to the second partitioned region. In this case, an aspect ratio of the screen may mean the aspect ratio of the first partitioned region for displaying the video data. Hence, the control unit 270 adjusts a vertical width of the second region of the flexible display to match a size of the first partitioned region to the aspect ratio. This shall be described in detail with reference to FIGS. 11 to 14 later.

In case that at least two contents are received by the receiving unit 205, the control unit 270 partitions a screen within the flexible display into a plurality of partitioned regions and then controls video data of different contents to be displayed on a plurality of the partitioned regions, respectively. According to an embodiment, the receiving unit 205 may include a plurality of tuners 210.

According to an embodiment, the video data in the content received by the receiving unit 205 may be displayed on the first partitioned region within the screen of the flexible display and a video data within a content included in a storage medium owned by a user may be displayed on the second partitioned region within the screen of the flexible display. In this case, the storage medium may include the storage unit 240 of the multimedia device 200 or an external storage medium (e.g., USB memory, etc.) connected to the multimedia device 200 via the external device interface unit 235. This shall be described in detail with reference to FIGS. 15 to 17 later.

While the multimedia device 200 is in the state of the standby mode, a light source of the display unit 280 is turned on in part to play a role as an illumination. If the multimedia device 200 is in the state of the standby mode, it may mean that a user does not use a unique function (e.g., a contents view, a search via internet, etc.) of the multimedia device 200. This shall be described in detail with reference to FIG. 18 later.

In case that the multimedia device 200 is paired via network with such a device as a user's mobile phone, a home phone, an indoor thermometer and the like, the multimedia device 200 receives informations from the devices via the internal device interface (i.e., the network interface 230) or the external device interface unit 235 and then displays the received informations on the display unit 280, thereby play a role in guiding informations. This shall be described in detail with reference to FIG. 19 later.

The sensor unit 260 can include at least one of an eye recognition sensor for recognizing a user's eye, a motion recognition sensor for recognizing a user's motion, a voice recognition sensor for recognizing a user's voice and the like.

In particular, the sensor unit 260 recognizes a user's eye using the eye recognition sensor and the control unit 270 is then able to adjust a height of the flexible display to enable a screen of the flexible display to fit a user's eye height. This shall be described in detail with reference to FIG. 21 later.

The sensor unit 260 recognizes a user's motion using the motion recognition sensor and the control unit 270 is then able to adjust a height of the flexible display to enable a screen of the flexible display to be situated at a user-desired height. And, the storage unit 240 can store a control signal matching each user's motion. This shall be described in detail with reference to FIG. 22 later.

The sensor unit 260 recognizes a user's voice using the voice recognition sensor and the control unit 270 is then able to adjust a height of the flexible display to enable a screen of the flexible display to be situated at a user-desired height. And, the storage unit 240 can store a control signal matching each user's voice.

FIG. 4 is a diagram for another example of component modules of a multimedia device including a flexible display according to one embodiment of the present invention. In the following description, another example of component modules of a multimedia device including a flexible display according to one embodiment of the present invention is explained with reference to FIG. 4. A multimedia device 400 shown in FIG. 4 corresponds to the former multimedia device shown in FIGS. 1 to 3.

Referring to FIG. 4, a multimedia device 400 may include a network interface 401, a TCP/IP manager 402, a service delivery manager 403, a demultiplexer (Demux) 405, a PSI & (PSIP and/or SI) decoder 404, an audio decoder 406, a video decoder 407, a display module (Display A/V and OSD Module) 408, a service control manager 409, a service discovery manager 410, a metadata manager 412, an SI & Metadata DB 411, a UI manager 414, a service manager 413 and the like. Yet, the scope of the appended claims and their equivalents may be non-limited by the components shown in FIG. 4. And, it is possible to add or delete module(s) in the necessity for those skilled in the art.

First of all, the network interface 401 receives packets from a network and transmits packets to the network. In particular, the network interface 401 receives a service, a content and the like from a service provider via the network. And, the network interface 401 corresponds to the receiving unit 205 shown in FIG. 2.

The TCP/IP manager 402 manages a packet received by the multimedia device 400 and a packet transmitted by the IPTV 400. In particular, the TCP/IP manager 402 manages a packet delivery from a source to a destination. The TCP/IP manager 402 sorts the received packets to correspond to an appropriate protocol and then transmits the sorted packets to the service delivery manager 405, the service discovery manager 410, the service control manager 409 and the metadata manager 412.

The service delivery manager 403 is responsible for a control of the received service data. For instance, in case of controlling real-time streaming data, the service delivery manager 403 can use RTP/RTCP. In case of transmitting the real-time streaming data using RTP, the service delivery manager 403 parses the received data packet by the RTP and then transmits the parsed data packet to the demultiplexer 405 or saves the parsed data packet in the SI & Metadata DB 411. And, the service delivery manager 403 feeds back the network received data to a service side, which provides a service, using the RTCP.

The demultiplexer (Demux) 405 demultiplexes the received packets into audio data, video data, PSI (program specific information) data and the like and then transmits the demultiplexed data to the audio decoder 406, the video decoder 407 and the PSI (PSIP and/or SI) decoder 404, respectively.

The PSI & (PSIP and/or SI) decoder 404 decodes such service information as PSI (program specific information) and the like for example. In particular, the PSI & (PSIP and/or SI) decoder 404 receives a PSI section, a PSIP (program and service information protocol) section, an SI (service information) section and the like, which are demultiplexed by the demultiplexer 405, and then decodes the received sections.

Moreover, the PSI & (PSIP and/or SI) decoder 404 creates a database for the service information by decoding the received sections and then saves the database for the service information in the SI & Metadata DB 411. In this case, an aspect ratio information of a content may be included in the decoded service information.

The audio decoder 406 and the video decoder 407 decode the video data and the audio data, which are received from the demultiplexer 405, respectively. Subsequently, audio data decoded by the audio decoder 406 and video data decoded by the video decoder 407 are provided to a user through the display module (Display AN and OSD Module) 408.

The UI manager 414 and the service manager 413 manage overall states of the multimedia device 400, provide a user interface, and also manage other managers.

The UI manager 414 provides a GUI (graphic user interface) for a user using an OSD (on screen display) and the like. The UI manager 414 receives a key input from the user and then performs a receiver operation in response to the received input. For instance, if the UI manager 414 receives a key input for a channel selection from the user, the UI manager 414 transmits a corresponding key input signal to the service manager 413.

The service manager 413 controls such a manager associated with a service as the service delivery manager 403, the service discovery manager 410, the service control manager 409, the metadata manager 412 and the like.

The service manager 413 creates a channel map and then selects a channel in response to the key input received from the user interface manager 414 using the channel map. The service manager 413 receives a service information of a channel from the PSI & (PSIP and/or SI) decoder 404 and then configures an audio/video PID (packet identifier) of the selected channel in the demultiplexer 405.

The service discovery manager 410 provides information necessary to select a service provider that provides a service. In case of receiving a signal related to the channel selection from the service manager 413, the service discovery manager 410 searches services using the information.

The service control manager 409 is responsible for a selection and control of a service. For instance, if a user selects a live broadcasting service of the same existing broadcasting system, the service control manager 409 uses IGMP, RTSP or the like. In case of selecting such a service as a VOD (video on demand) service and the like, the service control manager 409 performs the selection and control of the service using the RTSP. The RTSP protocol can provide a trick mode for a real-time streaming. And, the service control manager 409 can initialize and manage a session through an IMC gate using IMS (IP multimedia subsystem) and SIP (session initiation protocol). The above protocols are provided for example and other protocols are available depending on examples of implementations.

The metadata manager 412 manages metadata associated with a service and saves the metadata in the SI & Metadata DB 411.

The SI & Metadata DB 411 stores the service information decoded by the PSI & (PSIP and/or SI) decoder 404, the metadata managed by the metadata manager 412 and the information necessary to select a service provided by the service discovery manager 410. And, setup data for the system and the like can be saved in the SI & Metadata DB 411.

The SI & Metadata DB 411 can be implemented using a nonvolatile RAM (NVRAM), a flash memory and/or the like. Meanwhile, the IG 450 includes a gateway in which functions necessary to access an IMS based IPTV service are collected.

FIG. 5 is a diagram for a further example of component modules of a multimedia device including a flexible display according to one embodiment of the present invention. In the following description, a further example of component modules of a multimedia device including a flexible display according to one embodiment of the present invention is explained with reference to FIG. 5. A multimedia device 500 shown in FIG. 5 corresponds to the former multimedia device shown in FIGS. 1 to 4.

Referring to FIG. 5, for example, a multimedia device 500 may include a broadcast interface 501, a section filter 502, an AIT filter 503, an application data processor 504, a broadcast data processor 511, a media player 506, an internet protocol processor 507, an internet interface 508, a run time module 509 and the like. Yet, the scope of the appended claims and their equivalents may be non-limited by the components shown in FIG. 5. And, it is possible to add or delete module(s) in the necessity for those skilled in the art. And, the media player 506 may correspond to the display unit 280 shown in FIG. 2.

Through the broadcast interface 501, AIT (application information table) data, real-time broadcast content, application data and stream event are received. Meanwhile, the real-time broadcast content can be named a linear A/V content. The broadcast interface 501 corresponds to the receiving unit 205 shown in FIG. 2.

The section filter 502 performs section filtering on the 4 kinds of data received via the broadcast interface 501 and then transmits the AIT data, the linear A/V content and the stream event & application data to the AIT filter 503, the broadcast data processor 511 and the application data processor 504, respectively.

Meanwhile, through the internet interface 508, a non-linear A/V content and application data are received. In particular, the non-linear A/V content may include a COD (content on demand) application for example. And, the internet interface 508 corresponds to the receiving unit 205 shown in FIG. 2.

The non-linear A/V content is transmitted to the media player 506, while the application data is transmitted to the runtime module 509.

Moreover, the runtime module 509 may include an application manager and a browser, as shown in FIG. 5, for example. The application manager controls a life cycle for an interactive application using the AIT data for example. And, the browser performs a function of displaying and processing the interactive application.

FIG. 6 is a diagram of an exterior of a remote controller configured to control a multimedia device including a flexible display according to one embodiment of the present invention. In the following description, an exterior of a remote controller configured to control a multimedia device including a flexible display according to one embodiment of the present invention is explained with reference to FIG. 6. And, the multimedia device may correspond to the multimedia device shown in FIGS. 1 to 5.

Referring to FIG. 6 (*a*), a pointer 615 corresponding to a remote controller 300 is displayed on a screen 610 in a flexible display for example.

A user is able to move or rotate the remote controller 300 in top and bottom directions, right and left directions [FIG. 6 (*b*)] and front and rear directions [FIG. 6 (*c*)]. The pointer 615 displayed on the screen 610 in the flexible display responds to a motion of the remote controller 300. Since the pointer 615 is displayed by being shifted in response to a motion of the remote controller 300 in a 3D space, the remote controller 300 may be named a space remote controller.

In the example shown in FIG. 6 (*b*), if a user moves the remote controller 300 in the left direction, the pointer 615 displayed on the screen 610 within the flexible display moves in the left direction in response to the motion of the remote controller 300.

Information on the motion of the remote controller 300 sensed by a sensor of the remote controller 300 is transmitted to the multimedia device. Subsequently, the multimedia device can calculate coordinates of the pointer 615 from the information on the motion of the remote controller 300. The multimedia device is then able to display the pointer 615 to correspond to the calculated coordinates.

In the example shown in FIG. 6 (*c*), while a specific button in the remote controller 300 is pressed, a user moves the remote controller 300 to get away from the multimedia device. Hence, a selected region in the screen 610 corresponding to the pointer 615 can be enlarged and displayed by zoom-in. On the contrary, if a user moves the remote controller 300 to get closer to the multimedia device. Hence, a selected region in the screen 610 corresponding to the pointer 615 can be reduced and displayed by zoom-out. On the other hand, if the remote controller 300 gets away from the multimedia device, a selected region may zoom out. If the remote controller 300 gets closer to the multimedia device, a selected region may zoom in.

FIG. 7 is a detailed diagram of inner component modules of a remote controller configured to control a multimedia device including a flexible display according to one embodiment of the present invention.

Referring to FIG. 7, a remote controller 300 may include a wireless communication unit 325, a user input unit 335, a sensor unit 340, an output unit 350, a power supply unit 360, a storage unit 370 and a control unit 380 for example.

The wireless communication unit 325 transceives signals with a multimedia device 700. And, the multimedia device 700 may correspond to the multimedia device shown in FIGS. 1 to 5.

According to the present embodiment, the remote controller 300 may include an RF module 321 configured to transceive signals with the multimedia device 700 by RF communication protocol. And, the remote controller 300 may include an IR module 323 configured to transceive signals with the multimedia device 700 by IR communication protocol.

According to the present embodiment, the remote controller 300 transmits a signal containing an information on a motion of the remote controller 300 and the like to the multimedia device 700 via the RF module 321.

The remote controller 300 can receive a signal transmitted by the multimedia device 700 via the RF module 321 as well. And, the remote controller 300 can transmit a command for power-on/off, channel switching, volume adjustment or the like to the multimedia device 700 via the IR module 323 if necessary.

The user input unit 335 may include at least one of a keypad, buttons, a touchpad, a touchscreen and the like. A user is able to input a command associated with the multimedia device 700 to the remote controller 300 by manipulating the user input unit 335. The sensor unit 340 may include at least one of a gyro sensor 341 and an acceleration sensor 343. In particular, the gyro sensor 341 is configured to sense the information on the motion of the remote controller 300.

For instance, the gyro sensor 341 can sense the information on an action of the remote controller 300 with reference to x-, y- and z-axes. And, the acceleration sensor 343 can sense the information on a moving speed of the remote controller 300 and the like. Meanwhile, the sensor unit 340 may further include a distance measurement sensor configured to sense a distance from the multimedia device 700.

The output unit 350 can output a video or audio signal corresponding to the manipulation on the user input unit 335 or to the signal transmitted by the multimedia device 700. Through the output unit 350, a user can recognize whether the user input unit 335 is manipulated or whether the multimedia device 700 is controlled.

For instance, the output unit 350 may include at least one of an LED module 351, which is turned on if the user input unit 335 is manipulated or a signal is transceived with the multimedia device 700 via the wireless communication unit 325, a vibration module 353, which generates vibration if the user input unit 335 is manipulated or a signal is transceived with the multimedia device 700 via the wireless communication unit 325, an audio (sound) output module 355, which outputs an audio if the user input unit 335 is manipulated or a signal is transceived with the multimedia device 700 via the wireless communication unit 325, and a display module 357, which outputs a video or image if the user input unit 335 is manipulated or a signal is transceived with the multimedia device 700 via the wireless communication unit 325.

The power supply unit 360 supplies a power to the remote controller 300. If the remote controller 300 does not move for a prescribed duration, the power supply unit 360 can save power consumption by stopping a power supply. If a prescribed key provided to the remote controller 300 is manipulated, the power supply unit 360 resumes the power supply.

The storage unit 370 can store various kinds of programs, application data and the like, which are required for controls and/or operations of the remote controller 300. If the remote controller 300 transceives signals with the multimedia device 700 via the RF module 321 by wireless, signals are transceived on a prescribed frequency band between the remote controller 300 and the multimedia device 700. The control unit 380 of the remote controller 300 can save information on a frequency band for transceiving signals with the multimedia device 700 paired with the remote controller 300 by wireless and the like in the storage unit 370 and is then able to refer to the saved information.

The control unit 380 controls all particulars related to the controls of the remote controller 300. The control unit 380 can transmit a signal corresponding to a prescribed key manipulation of the user input unit 335 or a signal corresponding to a motion of the remote controller 300 sensed by the sensor unit 340 to the multimedia device 700 via the wireless communication unit 325.

In particular, the present invention is characterized in that a user interface unit of a multimedia device according to one embodiment of the present embodiment is designed to receive a command signal from the remote controller 300 that transmits an input signal attributed to a user's motion.

FIG. 8 is a diagram of a multimedia device according to one embodiment of the present invention.

Referring to FIG. 8, a multimedia device 800 according to one embodiment of the present invention may include a guide bar 810 and a flexible display 820 supported by the guide bar 810. In the flexible display 820, a part of the flexible display 820 rolled up on an outer circumference of the guide bar 810 shall be named a first region and a part of the flexible display 820 not rolled up on the outer circumference of the flexible display 820 shall be named a second region 830. A screen is situated in the second region 830 of the flexible display 820 not rolled up on the outer circumference of the guide bar 820.

The multimedia device 800 receives a content and metadata corresponding to the content from a source device and then extracts an aspect ratio information from the received metadata. In this case, an aspect ratio means a width to length ratio of a screen. Using the aspect ratio information, it is able to obtain an aspect ratio of a screen optimized for the received content.

The multimedia device 800 adjusts a vertical width W1 of the second region 830 of the flexible display 820 in accordance with the extracted aspect ratio information. In particular, the adjustment of the vertical width W1 of the second region 830 is performed in a manner of adjusting an extent of rolling up the flexible display 820 on an outer circumference of the guide bar 810.

As a result of the aspect ratio information extracted from the received metadata by the multimedia device 800, assume that an aspect ratio of the screen optimized for the content is 21:9.

In a storage unit of the multimedia device 800, a function or lookup table for determining the vertical width W1 of the second region 830 may be saved in advance in accordance with the aspect ratio of the screen of the flexible display 820.

The multimedia device 800 extracts the aspect ratio information of the screen optimized for the content and then detects the function or a value in the lookup table by accessing the storage unit. Subsequently, the multimedia device 800 determines the vertical width W1 of the second region 830 using the detected function or value in the lookup table.

Subsequently, the multimedia device 800 detects a vertical width W1 of the second region 830 in a current state and is then able to determine whether to decrease the vertical width W1 of the second region 830 by rolling up the flexible display 820 on the outer circumference of the guide bar 810 or increase the vertical width W1 of the second region 830 by unrolling the part of the flexible display 820 rolled up on the outer circumference of the guide bar 810, depending on the determined vertical width W1 of the second region 830.

According to the present invention, since a size of the screen within the flexible display 820 can be adjusted to fit the aspect ratio of 21:9 optimized for the received content, a user can watch the content on a full screen without margin to increase user's immersion in the content.

FIG. 9 is a diagram of a multimedia device according to another embodiment of the present invention.

Referring to FIG. 9, a multimedia device 900 according to another embodiment of the present invention may include a guide bar 910 and a flexible display 920 supported by the guide bar 910. In the flexible display 920, a part of the flexible display 920 rolled up on an outer circumference of the guide bar 910 shall be named a first region and a part of the flexible display 920 not rolled up on the outer circumference of the flexible display 920 shall be named a second region 930. A screen is situated in the second region 930 of the flexible display 920 not rolled up on the outer circumference of the guide bar 920.

The multimedia device 900 receives a content and metadata corresponding to the content from a source device and then extracts an aspect ratio information from the received metadata.

According to the present embodiment, assume a case that the user watches the received content shown in FIG. 9 in the course of watching the former content shown in FIG. 8. And, assume that a result of the extraction of the aspect ratio information extracted from the received metadata by the multimedia device 900 indicates that an aspect ratio of a screen optimized for the content is 16:9.

The multimedia device 900 extracts the aspect ratio information of the screen optimized for the content and then detects the function or a value in the lookup table by accessing the storage unit. Subsequently, the multimedia device 900 determines the vertical width W2 of the second region 930 using the detected function or value in the lookup table.

Subsequently, the multimedia device 900 detects a vertical width W2 of the second region 930 in a current state. Since the content of the former embodiment shown in FIG. 8 is assumed as currently watched, the vertical width W2 of the second region 930 in the current state may be equal to the vertical width W1 shown in FIG. 8. In particular, since the second region 930 in the current state is made to fit the aspect ratio of 21:9, as shown in FIG. 8, the multimedia device 900 increases the vertical width W2 of the second region 930 by unrolling the part of the flexible display 920 rolled up on the outer circumference of the guide bar 910 in accordance with the determined vertical width W2 of the second region 930.

Therefore, the multimedia device according to the present invention automatically adjusts a size of the screen within the flexible display depending on the aspect ratio of the screen optimized for the content despite a type of the content is changed, whereby a user can watch the content on a full screen without a margin.

FIG. 10 is a diagram for one example of a GUI displayed on a screen in a multimedia device according to another embodiment of the present invention.

Referring to FIG. 10, a multimedia device according to another embodiment of the present invention displays a GUI 1000 for receiving a command signal for selecting an aspect ratio of a screen within a flexible display.

A user may desire to watch a content at an aspect ratio of a screen preferred by the user without using an aspect ratio information included in a received metadata. In this case, the multimedia device displays the GUI 1000 on the screen within the flexible display and then receives a user selection for an aspect ratio of the screen.

In particular, the user selects the aspect ratio of the screen in a manner of selecting one of check boxes 1011 to 1014 corresponding to various aspect ratios included in the GUI 1000, respectively. In more particular, the user shifts a pointer 1020, which corresponds to a motion of the remote controller 300, to one of the check boxes 1011 to 1014 and is then able to select an aspect ratio, using the remote controller 300 described in detail with reference to FIG. 6 and FIG. 7.

In case that the user selects a direct input menu 1014, the user can input a width to length ratio of a screen to an input window 1030 using numerals. According to the present embodiment, a numeral pad for inputting numerals to the input window 1030 may be included in the GUI 1000.

If a user input for an aspect ratio of a screen is made through the GUI 1000, the multimedia device adjusts a vertical width of a second region of the flexible display in accordance with the user input instead of aspect ratio information in metadata.

Meanwhile, it may happen that an aspect ratio information optimized for a content is not included in metadata of the content received by the multimedia device. In this case, the multimedia device can adjust a vertical width of the second region of the flexible display in accordance with an aspect ratio inputted by a user.

FIG. 11 is a diagram of a multimedia device according to another embodiment of the present invention.

Referring to FIG. 11, a multimedia device 1100 according to another embodiment of the present invention may include a guide bar 1110 and a flexible display 1120 supported by the guide bar 1110. In the flexible display 1120, a part of the flexible display 1120 rolled up on an outer circumference of the guide bar 1110 shall be named a first region and a part of the flexible display 1120 not rolled up on the outer circumference of the flexible display 1120 shall be named a second region 1130. A screen is situated in the second region 1130 of the flexible display 1120 not rolled up on the outer circumference of the guide bar 1120.

The multimedia device 1100 receives a content and metadata corresponding to the content from a source device.

The multimedia device 1100 detects whether a caption data (e.g., a subtitle image, a text data, etc.) exists except video data included in the received content.

The multimedia device 1100 determines whether a separation command signal for displaying the video data and the caption data in a manner of separating the video data and the caption data from each other is received by being included in the received content or through a user input.

In response to the received separation command signal, the multimedia device 1100 partitions a screen within the second region 1130 of the flexible display 1120 and then controls the video data and the caption data to be displayed on a first partitioned region 1131 and a second partitioned region 1132, respectively.

In this case, an aspect ratio of the screen means an aspect ratio of the first partitioned region 1131 for displaying the video data thereon. Hence, in case of receiving the separation command signal, the multimedia device 1100 adjusts a vertical width W3 of the second region 1130 of the flexible display 1120 to enable a size of the first partitioned region 1131 to match the aspect ratio. In particular, the multimedia device 1100 adjusts the vertical width W3 of the second region 1130 of the flexible display 1120 in a manner of adding a vertical width W5 for the second partitioned region 1132 by enabling the size of the first partitioned region 1131 to match the aspect ratio.

Regarding a method of determining an aspect ratio of a screen, as mentioned in the foregoing description, an aspect ratio information can be extracted from a received metadata or an aspect ratio selecting signal can be inputted by a user through a GUI.

Regarding the adjustment of the vertical width W3 of the second region 1130 of the flexible display 1120, a vertical width W4 of the first partitioned region 1131 is determined using the function or value in the lookup table detected from the storage unit in accordance with the aspect ratio of the screen and the vertical width W5 of the second partitioned region 1132 is then added to the vertical width W4 of the first partitioned region 1131. In this case, as the vertical width W5 of the second partitioned region 1132, a preset value may be saved in the storage unit to prepare for a case of a presence of caption data.

According to the present invention, if there is a caption data to be displayed in a manner of being separated from a video data, a screen region is facilitated to increase in a manner of unrolling the flexible display 1120 rolled up on the outer circumference of the guide bar 1110 and the video data and the caption data are separately displayed. Therefore, the present invention can solve the problem that an image is blocked by a caption.

FIG. 12 is a diagram of a multimedia device according to another embodiment of the present invention.

Referring to FIG. 12, a multimedia device 1200 according to another embodiment of the present invention may include a guide bar 1210 and a flexible display 1220 supported by the guide bar 1210. In the flexible display 1220, a part of the flexible display 1220 rolled up on an outer circumference of the guide bar 1210 shall be named a first region and a part of the flexible display 1220 not rolled up on the outer circumference of the flexible display 1220 shall be named a second region 1230. A screen is situated in the second region 1230 of the flexible display 1220 not rolled up on the outer circumference of the guide bar 1220.

The multimedia device 1200 receives a content and metadata corresponding to the content from a source device.

The multimedia device 1200 detects whether a caption data (e.g., a subtitle image, a text data, etc.) exists except video data included in the received content. In doing so, the multimedia device 1200 can detect the number of caption data.

The multimedia device 1200 detects whether a caption data (e.g., a subtitle image, a text data, etc.) exists except the video data included in the received content. According to the present embodiment, assume a case that a plurality of caption data respectively consisting of a plurality of languages exist.

The multimedia device 1200 determines whether a separation command signal for displaying the video data and the caption data in a manner of separating the video data and the caption data from each other is received by being included in the received content or through a user input.

In response to the received separation command signal, the multimedia device 1200 partitions a screen within the second region 1230 of the flexible display 1220 and then controls the video data and the caption data to be displayed on a first partitioned region 1231 and a second partitioned region 1232, respectively.

In this case, an aspect ratio of the screen means an aspect ratio of the first partitioned region 1231 for displaying the video data thereon. Hence, in case of receiving the separation command signal, the multimedia device 1200 adjusts a vertical width W3 of the second region 1230 of the flexible display 1220 to enable a size of the first partitioned region 1231 to match the aspect ratio. In particular, the multimedia device 1200 adjusts the vertical width W3 of the second region 1230 of the flexible display 1220 in a manner of adding a vertical width W5 for the second partitioned region 1232 by enabling the size of the first partitioned region 1231 to match the aspect ratio.

Regarding the adjustment of the vertical width W3 of the second region 1230 of the flexible display 1220, a vertical width W4 of the first partitioned region 1231 is determined using the function or value in the lookup table detected from the storage unit in accordance with the aspect ratio of the screen and the vertical width W5 of the second partitioned region 1232 is then added to the vertical width W4 of the first partitioned region 1231. In this case, the vertical width W5 of the second partitioned region 1232 is set wider than that of a case of one caption data. As the vertical width W5 of the second partitioned region 1232, a preset value may be saved in the storage unit to prepare for a case that the caption data consisting of a plurality of languages need to be simultaneously displayed.

According to a related art, when a content is watched in a manner that a caption in Korean and a caption in English are simultaneously displayed due to a language study or the like, it may cause a problem that user's immersion in the content is degraded due to a considerable size occupied by the caption data displayed by overlaying the screen.

According to the present invention, in case that a plurality of caption data respectively consisting of a plurality of languages exist, a screen region can be easily increased by unrolling the flexible display 1220 rolled up on the outer circumference of the guide bar 1210. And, a plurality of the caption data are simultaneously displayed by being separated from the video data. Therefore, the present invention can solve the problem that an image is blocked by a caption.

FIG. 13 is a diagram of a multimedia device according to another embodiment of the present invention.

Referring to FIG. 13, a multimedia device 1300 according to another embodiment of the present invention may include a guide bar 1310 and a flexible display 1320 supported by the guide bar 1310. In the flexible display 1320, a part of the flexible display 1320 rolled up on an outer circumference of the guide bar 1310 shall be named a first region and a part of the flexible display 1320 not rolled up on the outer circumference of the flexible display 1320 shall be named a second region 1330. A screen is situated in the second region 1330 of the flexible display 1320 not rolled up on the outer circumference of the guide bar 1320.

The multimedia device 1300 receives a content and metadata corresponding to the content from a source device.

The multimedia device 1300 determines whether a partition command signal for partitioning the screen of the flexible display 1320 is received through a user input.

In response to the received partition command signal, the multimedia device 1300 partitions a screen within the second region 1330 of the flexible display 1320 and then controls a video data and a setup data to be displayed on a first partitioned region 1331 and a second partitioned region 1332, respectively. In this case, the setup data means various kinds of data corresponding to such a signal for configuring an environment of the multimedia device 1300 as a volume control signal inputted by a user, a channel information signal, a screen brightness control signal and the like. According to an embodiment, if a control signal for displaying the setup data is detected, the multimedia device 1300 may recognize the control signal as the partition command signal.

In this case, an aspect ratio of the screen means an aspect ratio of the first partitioned region 1331 for displaying the video data thereon. Hence, in case of receiving the partition command signal, the multimedia device 1300 adjusts a vertical width W3 of the second region 1330 of the flexible display 1320 to enable a size of the first partitioned region 1331 to match the aspect ratio. In particular, the multimedia device 1300 adjusts the vertical width W3 of the second region 1330 of the flexible display 1320 in a manner of adding a vertical width W5 for the second partitioned region 1332 by enabling the size of the first partitioned region 1331 to match the aspect ratio.

Regarding the adjustment of the vertical width W3 of the second region 1330 of the flexible display 1320, a vertical width W4 of the first partitioned region 1331 is determined using the function or value in the lookup table detected from the storage unit in accordance with the aspect ratio of the screen and the vertical width W5 of the second partitioned region 1332 is then added to the vertical width W4 of the first partitioned region 1331. In this case, as the vertical width W5 of the second partitioned region 1332, a preset value may be saved in the storage unit to prepare for a case of a presence of a user input for displaying the setup data separately.

According to the related art, when a user adjusts a volume and the like in the course of watching a content, since a setup data corresponding to a volume control signal is displayed by overlaying the video data, it may cause a problem that user's immersion in the content is degraded.

According to the present invention, since a setup data can be displayed separately from a video data in a manner of partitioning a screen within a flexible display, the present invention can solve the problem that an image is blocked by the setup data.

FIG. 14 is a diagram of a multimedia device according to another embodiment of the present invention.

Referring to FIG. 14, a multimedia device 1400 according to another embodiment of the present invention may include a guide bar 1410 and a flexible display 1420 supported by the guide bar 1410. In the flexible display 1420, a part of the flexible display 1420 rolled up on an outer circumference of the guide bar 1410 shall be named a first region and a part of the flexible display 1420 not rolled up on the outer circumference of the flexible display 1420 shall be named a second region 1430. A screen is situated in the second region 1430 of the flexible display 1420 not rolled up on the outer circumference of the guide bar 1420.

The multimedia device 1400 receives a content and metadata corresponding to the content from a source device. According to the present embodiment, assume a case that the multimedia device 1400 receives widget application data of weather, stock market information and the like from an external server.

The multimedia device 1400 determines whether a partition command signal for partitioning the screen of the flexible display 1420 is received through a user input.

In response to the received partition command signal, the multimedia device 1400 partitions a screen within the second region 1430 of the flexible display 1420 and then controls a video data and the widget application data to be displayed on a first partitioned region 1431 and a second partitioned region 1432, respectively.

According to the present invention, if a user intends to know the weather or stock market information by real time in the course of watching the content, a screen for displaying the widget application data can be easily secured in a manner of increasing a screen region by unrolling the flexible display 1420 rolled up on the outer circumference of the guide bar 1420. Moreover, since a region for displaying the video data and a region for displaying the widget application data are separately provided within the content, it is advantageous in that user's immersion in the content can be maintained.

FIG. 15 and FIG. 16 are diagrams of a multimedia device according to another embodiment of the present invention.

Referring to FIG. 15, a multimedia device 1500 according to another embodiment of the present invention may include a guide bar 1510 and a flexible display 1520 supported by the guide bar 1510. In the flexible display 1520, a part of the flexible display 1520 rolled up on an outer circumference of the guide bar 1510 shall be named a first region and a part of the flexible display 1520 not rolled up on the outer circumference of the flexible display 1520 shall be named a second region 1530. A screen is situated in the second region 1530 of the flexible display 1520 not rolled up on the outer circumference of the guide bar 1520.

The multimedia device 1500 receives a plurality of contents and a plurality of metadata respectively corresponding to a plurality of the contents from a source device. In particular, the multimedia device 1500 may receive a plurality of contents from source devices of the same kind (e.g., a case of receiving two broadcast programs from two broadcasting stations, respectively). Alternatively, the multimedia device 1500 may receive a plurality of contents from a plurality of different source devices, respectively (e.g., a case of receiving a broadcast program signal from a broadcasting station and a VOD content from an IP server).

The multimedia device 1500 determines whether a partition command signal for partitioning the screen of the flexible display 1520 is received through a user input. In case of intending to watch a plurality of contents simultaneously, a user can transmit the partition command signal to the multimedia device 1500 using a remote controller. According to the present embodiment, assume a case that a user intends to watch two contents simultaneously.

In response to the received partition command signal, the multimedia device 1400 partitions a screen within the second region 1530 of the flexible display 1520 and then controls a video data of a first content and a video data of a second content to be displayed on a first partitioned region 1531 and a second partitioned region 1532, respectively. In doing so, an audio data of the first content is outputted through an audio output unit built in the multimedia device 1500 and an audio data of the second content may be outputted through an external audio output device (e.g., earphones, etc.) connected via an external device interface unit of the multimedia device 1500.

The multimedia device 1500 can determine a vertical width W6 of the flexible display 1530, a horizontal width W7 of the first partitioned region 1531 and a horizontal width W8 of the second partitioned region 1532 in accordance with an aspect ratio of a screen. In this case, the aspect ratio of the screen may include an aspect ratio included in the received content or an aspect ratio selected by a user through a GUI. In case that a user selects an aspect ratio through the GUI, the user may select aspect ratios for a plurality of contents, respectively. Alternatively, the user may select an aspect ratio for one content only and can use aspect ratio information included in the metadata for another content.

The following description is made on the assumption of a case of obtaining an information indicating that an aspect ratio optimized for a first content is 21:9 from a metadata corresponding to the first content and obtaining an information indicating that an aspect ratio optimized for a second content is 16:9 from a metadata corresponding to the second content.

First of all, based on a horizontal width rate included in the aspect ratio information of the first content and a horizontal width rate included in the aspect ratio information of the second content, the multimedia device 1500 determines the horizontal width W7 of the first partitioned region 1531 and the horizontal width W8 of the second partitioned region 1532. In case of applying the same screen partition unit to each of the first content and the second content, the horizontal width W7 of the first partitioned region 1531 and the horizontal width W8 of the second partitioned region 1532 may correspond to a ratio of 21:16 on a total horizontal width of the flexible display 1520.

Once the multimedia device 1500 determines the horizontal width W7 of the first partitioned region 1531 and the horizontal width W8 of the second partitioned region 1532, the multimedia device 1500 determines the vertical width W6 of the second region 1530 of the flexible display 1520. In particular, it is able to determine the vertical width W6 of the second region 1530 of the flexible display 1520 using an aspect ratio information corresponding to one of the first and second contents, which requires a screen having a greater vertical width. FIG. 15 shows one example of a case that each of the first and second contents needs a screen of the same vertical width. FIG. 16 shows one example of a case that the second contents needs a screen of a vertical width greater than that of a screen of the first content. In case of FIG. 16, margins may exist on top and bottom ends of the first partitioned region 1531 for displaying the video data of the first content.

Alternatively, in the embodiment shown in FIG. 16, when video data in the first content is displayed on a first partitioned region 1531, the multimedia device 1500 can display the video data in the first content in a manner that a margin exists on a top or bottom side of the first partitioned region 1531 only by a preset condition. For instance, when a child intends to watch the video data in the first content, the video data in the first content may be displayed in a manner of inclining toward the bottom side in the first portioned region 1531. The preset condition may include a condition for receiving a command signal for selecting a display region of the video data in the first content within the first partitioned region from a user or a condition for receiving a control signal outputted to the controller by a sensor configured to sense user's eye(s).

FIG. 17 is a diagram of a multimedia device according to another embodiment of the present invention.

Referring to FIG. 17, a multimedia device 1700 according to another embodiment of the present invention may include a guide bar 1710 and a flexible display 1720 supported by the guide bar 1710. In the flexible display 1720, a part of the flexible display 1720 rolled up on an outer circumference of the guide bar 1710 shall be named a first region and a part of the flexible display 1720 not rolled up on the outer circumference of the flexible display 1720 shall be named a second region 1730. A screen is situated in the second region 1730 of the flexible display 1720 not rolled up on the outer circumference of the guide bar 1720.

The multimedia device 1700 receives a content and metadata corresponding to the content from a source device. According to the present embodiment, assume a case that a plurality of contents are received. And, assume a case that a first command signal for partitioning a screen is received from a user to watch a plurality of the contents simultaneously.

The multimedia device 1700 determines whether a caption data (e.g., a subtitle image, a text data, etc.) exists except the video data included in the received content.

The multimedia device 1700 determines whether a second command signal for displaying the video data and the caption data in a manner of separating the video data and the caption data from each other is received by being included in the received content or through a user input.

In response to the received first and second command signals, the multimedia device 1700 partitions a screen within the second region 1730 of the flexible display 1720 and then controls a video data of a first content, a video data of a second content and a video data of a third content to be displayed on a first partitioned region 1731, a second partitioned region 1732 and a third partitioned region 1733, respectively.

FIG. 18 is a diagram of a multimedia device according to a further embodiment of the present invention.

Referring to FIG. 18, a multimedia device 1800 according to a further embodiment of the present invention controls a light source of a flexible display 1820 to be turned on in part in standby mode, thereby enabling the flexible display 1820 to play a role as an illumination (e.g., an indirect illumination, a mood illumination, etc.). If the multimedia device 1800 is in the standby mode, it may mean a case that a user does not use a function (e.g., a content watching, a search via internet, etc.) unique to the multimedia device 1800. And, the user is able to adjust a vertical width of the second region 1830 of the flexible display 1820 by controlling a desired extent of the flexible display 1820 rolled up on an outer circumference of a guide bar 1810.

FIG. 19 is a diagram of a multimedia device according to another further embodiment of the present invention.

Referring to FIG. 19, when a multimedia device 1900 according to another further embodiment of the present invention is in standby mode, the multimedia device 1900 can play a role as an information guide in displaying information received from another indoor home device or a portable or mobile device of a user. In doing so, assume that the multimedia device 1900 is paired with the indoor home device or the user's portable device.

The multimedia device 1900 is able to receive such information as a presence or non-presence of an absent call, a current weather information, an inner-house temperature and the like from the paired indoor home device (e.g., a phone, a thermometer, an illumination, etc.) or the paired portable device (e.g., a mobile phone, etc.) of the user. The multimedia device 1900 processes the received information into graphic data or text data and is then able to display the processed data through a flexible display 1920. And, the user is able to adjust a vertical width of a second region 1930 of the flexible display 1920 by controlling a desired extent of the flexible display 1920 rolled up on an outer circumference of a guide bar 1910.

FIG. 20 is a diagram to describe one example of adjusting a height of a multimedia device according to one embodiment of the present invention.

Referring to FIG. 20, a multimedia device 2000 according to one embodiment of the present invention may include a guide bar 2010 and a flexible display 2020 supported by the guide bar 2010.

The guide bar 2010 is installed as height-adjustable. For instance, a string 2030 may be attached to the guide bar 2010 to adjust a height of the guide bar 2010. A user can adjust the height of the guide bar 2010 by adjusting a length of the string 2030. Hence, the user is able to watch a content while a height of the flexible display 2020 is adjusted to fit user's eye level.

According to an embodiment, a distance detecting sensor (not shown in the drawing) may be provided to each of a top and bottom of the guide bar 2010. If the guide bar 2010 ascends in a predetermined distance from a ceiling or descends in a predetermined distance from a ground, the distance detecting sensor senses the corresponding ascent or descent to stop the ascent or descent of the guide bar 2010.

FIG. 21 is a diagram for one example of a multimedia device having a sensor according to one embodiment of the present invention.

Referring to FIG. 21, a multimedia device 2100 according to one embodiment of present invention may include a guide bar 2110 and a flexible display 2120 supported by the guide bar 2110.

The multimedia device 2100 includes a sensor S for recognizing user's eye(s). The multimedia device 2100 recognizes the user's eye through the sensor S and is then able to adjust a height of the guide bar 2110 to control the sensor S and the user's eye to be situated in parallel with each other on the same level. If the sensor S and the user's eye are situated in parallel with each other on the same level, it may mean that the sensor S and the user's eye just need to be situated in a preset error range without being exactly situated on 180° line. For instance, the height of the guide bar 2110 can be adjusted by a length of a string 2130 attached to the guide bar 2110.

According to the present invention, the heights of the guide bar 2110 and the flexible display 2120 can be automatically adjusted to fit the user's eye level, whereby user's convenience can be enhanced.

In the description with reference to FIG. 21, the sensor S includes a sensor configured to recognize user's eye(s). Alternatively, a sensor for recognizing a user's face is available as well. In the description with reference to FIG. 21, the sensor S is provided to a center of a bottom end of the flexible display 2120. Alternatively, a location of the sensor S is variable depending on an embodiment.

FIG. 22 is a diagram for another example of a multimedia device having a sensor according to one embodiment of the present invention.

Referring to FIG. 22, a multimedia device 2200 according to one embodiment of present invention may include a guide bar 2210 and a flexible display 2220 supported by the guide bar 2210.

The multimedia device 2200 may include a motion recognition sensor (not shown in the drawing) configured to recognize a user's motion. The multimedia device 2200 recognizes a user's motion using the motion recognition sensor and is then able to adjust a height of the guide bar 2210 in response to a control signal corresponding to the recognized motion. And, the control signal corresponding to the user's motion can be saved in a storage unit of the multimedia device 2200 in advance.

For instance, assume a case that a first motion, which is performed in a manner that a user raises a hand or arm of the user upward, is saved by matching a first control signal of lifting up the guide bar 2210. And, assume a case that a second motion, which is performed in a manner that a user lowers down a hand or arm of the user, is saved by matching a second control signal of lifting down the guide bar 2210.

If a user takes the first motion, the multimedia device 2200 detects the first motion through the motion recognition sensor and then adjusts a height of the flexible display 2220 by lifting up the guide bar 2210 in response to the first control signal. If a user takes the second motion, the multimedia device 2200 detects the second motion through the motion recognition sensor and then adjusts a height of the flexible display 2220 by lifting down the guide bar 2210 in response to the second control signal. For instance, the height adjustment of the guide bar 2210 can be adjusted by the length of the string 2230 attached to the guide bar 2210.

According to the present invention, since a user can adjust the heights of the guide bar 2210 and the flexible display 2220 to fit a user's eye level by simply taking an intuitive motion, user's convenience can be enhanced.

FIG. 23 is a flowchart for a method of controlling a multimedia device according to one embodiment of the present invention.

Referring to FIG. 23, a multimedia device receives a content and metadata corresponding to the content from a source device [S2310]. Subsequently, the multimedia device determines whether there is a user input for setting an aspect ratio of a screen [S2320]. If there is the user input for setting the aspect ratio of the screen, the multimedia device adjusts a size of the screen by adjusting an extent of a flexible display rolled up on an outer circumference of a guide bar in accordance with the inputted aspect ratio [S2340]. On the contrary, if there is no user input for setting the aspect ratio of the screen, the multimedia device extracts an aspect ratio information from the received metadata [S2330] and then adjusts a size of the screen by adjusting an extent of the flexible display rolled up on the outer circumference of the guide bar in accordance with the extracted aspect ratio information [S2340]. Optionally, the step of determining whether there is the user input for setting the aspect ratio of the screen may be skipped and the step S2330 can be performed in direct, depending on an embodiment.

Although the description of the present invention is explained with reference to each of the accompanying drawings for clarity, it is possible to design new embodiment(s) by merging the embodiments shown in the accompanying drawings with each other. And, if a recording medium readable by a computer, in which programs for executing the embodiments mentioned in the foregoing description are recorded, is designed in necessity of those skilled in the art, it may belong to the scope of the appended claims and their equivalents.

A multimedia device and operating method thereof according to the present invention may be non-limited by the configurations and methods of the embodiments mentioned in the foregoing description. And, the embodiments mentioned in the foregoing description can be configured in a manner of being selectively combined with one another entirely or in part to enable various modifications.

Meanwhile, a method of operating a multimedia device according to the present invention can be implemented with processor-readable codes in a processor-readable recording medium provided to a network device. The processor-readable medium may include all kinds of recording devices capable of storing data readable by a processor. The processor-readable medium may include one of ROM, RAM, CD-ROM, magnetic tapes, floppy discs, optical data storage devices, and the like for example and also include such a carrier-wave type implementation as a transmission via Internet. Furthermore, as the processor-readable recording medium is distributed to a computer system connected via network, processor-readable codes can be saved and executed according to a distributive system.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Both apparatus and method inventions are mentioned in this specification and descriptions of both of the apparatus and method inventions may be complementarily applicable to each other.

The present invention relates to a multimedia device including a flexible display and controlling method thereof. Therefore, the present invention has industrial applicability.

The invention claimed is:

1. A multimedia device comprising:
   a guide bar;
   a flexible display configured to be rolled up on an outer circumference of the guide bar, the flexible display having a first region rolled up on the outer circumference of the guide bar and a second region not rolled up on the outer circumference of the guide bar;
   a receiver configured to receive a content and metadata corresponding to the content from a source device; and
   a control unit adjusting a vertical width of the second region of the flexible display in accordance with a preset condition,
   wherein the control unit extracts an aspect ratio information from the received metadata and determines the vertical width of the second region of the flexible display in accordance with the extracted aspect ratio information,
   wherein the multimedia device is configured to:
   display video data in the received content on a first partitioned region of the second region, and display caption data on a second partitioned region of the second region if the caption data is included in the received metadata, and
   display, in a standby mode, information received from another indoor home device, a portable device or a mobile device on the second partitioned region of the second region, and
   wherein the second partitioned region of the second region is not rolled up on the outer circumference of the guide bar in the standby mode, and the second region is minimized in the standby mode.

2. The multimedia device of claim 1, further comprising a storage unit configured to store a function or lookup table for determining the vertical width of the second region in accordance with an aspect ratio of a screen within the second region of the flexible display,
   wherein the control unit detects the function or a value in the lookup table by accessing the storage unit and then determines the vertical width of the second region of the flexible display using the detected function or value in the lookup table.

3. The multimedia device of claim 1, further comprising a user interface configured to receive a command signal for selecting an aspect ratio of a screen within the second region of the flexible display,
   wherein the control unit determines the vertical width of the second region of the flexible display in accordance with the received command signal.

4. The multimedia device of claim 1, wherein the guide bar is installed to enable a height adjustment.

5. The multimedia device of claim 4, further comprising a sensor configured to sense a user's eye, wherein the control unit adjusts a height of the guide bar to enable the sensor and the user's eye to be situated in parallel with each other on a same level.

6. The multimedia device of claim 1, wherein a screen with the second region of the flexible display comprises at least one of the first partitioned region and the second partitioned region.

7. The multimedia device of claim 6, wherein if the caption data is included in the received metadata, the control unit controls the video data in the received content and the caption data to be displayed on the first partitioned region and the second partitioned region, respectively.

8. The multimedia device of claim 6, wherein the receiver is configured to receive at least two contents and
   wherein the control unit controls video data of the at least two contents to be displayed on the first partitioned region and the second partitioned region, respectively.

9. A method of controlling a multimedia device, which includes a control unit, a guide bar and a flexible display configured to be rolled up on an outer circumference of the guide bar, the method comprising:
   receiving a content and metadata corresponding to the content from a source device;
   extracting, via the control unit, an aspect ratio information from the received metadata;
   determining, via the control unit, a vertical width of a region in the flexible display not rolled up on the outer circumstance of the guide bar in accordance with the extracted aspect ratio information;
   adjusting an extent of the flexible display rolled up on the outer circumference of the flexible display in accordance with the extracted aspect ratio information;
   displaying video data in the received content on a first partitioned region of the region in the flexible display, and displaying caption data on a second partitioned region of the region in the flexible display not rolled up on the outer circumstance of the guide bar if the caption data is included in the received metadata; and
   displaying, in a standby mode, information received from another indoor home device, a portable device, or a mobile device on the second partitioned region of the region in the flexible display not rolled up on the outer circumstance of the guide bar,
   wherein the second partitioned region is not rolled up on the outer circumference of the guide bar in the standby mode, and the region in the flexible display not rolled up on the outer circumstance of the guide bar is minimized in the standby mode.

10. The method of claim 9, further comprising saving a function or lookup table for determining the vertical width of the region in the flexible display not rolled up on the outer circumference of the guide bar in accordance with an aspect ratio of a screen in the flexible display in a storage unit.

11. The method of claim 10, the adjusting the extent of the flexible display rolled up on the outer circumference of the flexible display, comprising:

detecting the function or a value in the lookup table by accessing the storage unit; and determining the vertical width of the region in the flexible display not rolled up on the outer circumference of the guide bar using the detected function or value in the lookup table.

12. The method of claim 9, further comprising:

sensing a user's eye using a sensor; and adjusting a height of the guide bar to enable the sensor and the user's eye to be situated in parallel with each other on a same level.

13. The method of claim 9, further comprising:

detecting the caption data from the received metadata; and if the caption data is detected, controlling the video data of the received content and the caption data to be displayed on the first partitioned region of the region of the flexible display not rolled up on the outer circumference of the guide bar and the second partitioned region of the region of the flexible display not rolled up on the outer circumference of the guide bar, respectively.

14. The method of claim 13, wherein at least two caption data are detected from the received metadata.

15. A method of controlling a multimedia device, which includes a control unit, a guide bar and a flexible display configured to be rolled up on an outer circumference of the guide bar, the method comprising:

receiving a content and metadata corresponding to the content from a source device;

receiving a command signal for selecting an aspect ratio of a screen in the flexible display;

extracting, via the control unit, an aspect ratio information from the received metadata;

determining, via the control unit, a vertical width of a region in the flexible display not rolled up on the outer circumstance of the guide bar in accordance with the extracted aspect ratio information;

adjusting an extent of the flexible display rolled up on the outer circumference of the flexible display in accordance with the received command signal;

displaying video data in the received content on a first partitioned region of the region in the flexible display, and displaying caption data on a second partitioned region of the region in the flexible display not rolled up on the outer circumstance of the guide bar if the caption data is included in the received metadata; and displaying, in a standby mode, information received from another indoor home device, a portable device, or a mobile device on the second partitioned region of the region in the flexible display not rolled up on the outer circumstance of the guide bar, wherein the second partitioned region is not rolled up on the outer circumference of the guide bar in the standby mode, and the region in the flexible display not rolled up on the outer circumstance of the guide bar is minimized in the standby mode.

16. The method of claim 15, further comprising saving a function or lookup table for determining the vertical width of the region in the flexible display not rolled up on the outer circumference of the guide bar in accordance with the aspect ratio of the screen in the flexible display in a storage unit.

17. The method of claim 16, the adjusting the extent of the flexible display rolled up on the outer circumference of the flexible display, comprising:

detecting the function or a value in the lookup table by accessing the storage unit; and determining the vertical width of the region in the flexible display not rolled up on the outer circumference of the guide bar using the detected function or value in the lookup table.

18. The method of claim 15, further comprising:

sensing a user's eye using a sensor; and adjusting a height of the guide bar to enable the sensor and the user's eye to be situated in parallel with each other on a same level.

19. The method of claim 15, further comprising:

detecting the caption data from the received metadata; and if the caption data is detected, controlling the video data of the received content and the caption data to be displayed on the first partitioned region of the region of the flexible display not rolled up on the outer circumference of the guide bar and the second partitioned region of the region of the flexible display not rolled up on the outer circumference of the guide bar, respectively.

* * * * *